(12) United States Patent
Hatanaka et al.

(10) Patent No.: US 7,203,312 B1
(45) Date of Patent: Apr. 10, 2007

(54) DATA REPRODUCTION APPARATUS AND DATA REPRODUCTION MODULE

(75) Inventors: Masayuki Hatanaka, Kawasaki (JP); Jun Kamada, Kawasaki (JP); Takahisa Hatakeyama, Kawasaki (JP); Takayuki Hasebe, Kawasaki (JP); Seigou Kotani, Kawasaki (JP); Shigeki Furuta, Kawasaki (JP); Takeaki Anazawa, Tokyo (JP); Toshiaki Hioki, Ogaki (JP); Miwa Kanamori, Ogaki (JP); Yoshihiro Hori, Gifu (JP)

(73) Assignees: Fujitsu Limited, Kawasaki (JP); Sanyo Electric Co., Ltd., Osaka (JP)

( * ) Notice: Subject to any disclaimer, the term of this patent is extended or adjusted under 35 U.S.C. 154(b) by 473 days.

(21) Appl. No.: 10/069,118

(22) PCT Filed: Aug. 29, 2000

(86) PCT No.: PCT/JP00/05832

§ 371 (c)(1),
(2), (4) Date: Jun. 11, 2002

(87) PCT Pub. No.: WO01/16933

PCT Pub. Date: Mar. 8, 2001

(30) Foreign Application Priority Data

Aug. 30, 1999 (JP) ................................. 11-243583
Dec. 2, 1999 (JP) ................................. 11-343707

(51) Int. Cl.
*H04N 7/167* (2006.01)
*H04L 9/00* (2006.01)
*H04K 1/00* (2006.01)
*G06Q 99/00* (2006.01)

(52) U.S. Cl. ...................... 380/201; 380/281; 380/217; 380/237; 380/250; 705/57; 713/165; 713/166; 713/167; 713/168

(58) Field of Classification Search ........ 713/165–268; 380/201, 217, 235–250, 281; 705/57
See application file for complete search history.

(56) References Cited

U.S. PATENT DOCUMENTS 5,917,912 A * 6/1999 Ginter et al. ................ 713/187

(Continued)

FOREIGN PATENT DOCUMENTS

EP 0 817 185 A2 1/1998

(Continued)

OTHER PUBLICATIONS

Partial translation of Nikkei Electronics, No. 739, pp. 49-53, Mar. 22, 1999. See PCT search rpt.

(Continued)

*Primary Examiner*—Christopher Revak
*Assistant Examiner*—Shin-Hon Chen
(74) *Attorney, Agent, or Firm*—Westerman, Hattori, Daniels & Adrian, LLP

(57) ABSTRACT

A cellular phone has distributed encrypted content data and an encrypted content key stored in a memory. The encrypted content key data read out from the memory is decrypted by a decryption processing unit using key data Kp stored in a Kp hold unit, and then applied to a audio reproduction module. A decryption processing unit decrypts encrypted content data read out from the memory using a content key Kc extracted by the decryption processing unit to reproduce content data Dc.

41 Claims, 22 Drawing Sheets

U.S. PATENT DOCUMENTS

| | | | |
|---|---|---|---|
| 6,131,162 A * | 10/2000 | Yoshiura et al. | 713/176 |
| 6,226,618 B1 * | 5/2001 | Downs et al. | 705/1 |
| 6,697,944 B1 * | 2/2004 | Jones et al. | 713/168 |
| 6,728,379 B1 * | 4/2004 | Ishibashi et al. | 380/278 |
| 6,857,071 B1 * | 2/2005 | Nakae | 713/156 |

FOREIGN PATENT DOCUMENTS

| | | |
|---|---|---|
| JP | 62-053042 A | 9/1987 |
| JP | 05-257816 A | 10/1993 |
| JP | 08-069419 A | 3/1996 |
| JP | 08-186667 A | 7/1996 |
| JP | 9-26798 | 1/1997 |
| JP | 9-326166 | 12/1997 |
| JP | 10-40172 | 2/1998 |
| JP | 10-136123 | 5/1998 |
| JP | 11-328033 A | 11/1999 |

OTHER PUBLICATIONS

Partial translation of Nikkei Electronics, No. 728, pp. 31-32, Oct. 19, 1998. See PCT search rpt.

Partial translation of Nikkei Electronics, No. 731, pp. 29-30, Nov. 30, 1998. See PCT search rpt.

Notice of Ground of Rejection Patent Application No. 2001-520399 Mailed Jul. 04, 2006.

"Ongaku Haishin Mattanashi", Nikkei Electronics No. 738, Nikkei Business Publications Inc., Mar. 8, 1999, pp. 87-111.

* cited by examiner

FIG.5

| | | SYMBOL | ATTRIBUTE | | PROPERTY |
|---|---|---|---|---|---|
| KEY ADMINISTERED WITHIN MEMORY CARD | | Km | PRIVATE DECRYPTION KEY | | UNIQUE TO EACH MEMORY CARD |
| | | KPm | PUBLIC ENCRYPTION KEY | FORM PAIR WITH Km | DATA ENCRYPTED WITH KPm IS DECRYPTABLE WITH ASYMMETRIC DECRYPTION KEY Km |
| KEY ADMINISTERED IN AUDIO REPRODUCTION MODULE | | Kp | PRIVATE DECRYPTION KEY | UNIQUE TO DATA REPRODUCTION APPARATUS (CELLULAR PHONE) | DIFFER FOR EACH DATA REPRODUCTION APPARATUS |
| | | Ks | SYMMETRIC KEY | UNIQUE TO SESSION | GENERATED FOR EVERY ACCESS BETWEEN MEMORY AND AUDIO REPRODUCTION MODULE |
| DISTRIBUTION DATA | | KPp | PUBLIC ENCRYPTION KEY | FORM PAIR WITH Kp (ENCRYPT Kc) | DATA ENCRYPTED WITH KPp CAN BE DECRYPTED USING ASYMMETRIC DECRYPTION KEY Kp |
| | | Kc | SYMMETRIC KEY | CONTENT KEY | DECRYPTION KEY OF ENCRYPTED CONTENT DATA |
| | | Dc | CONTENT DATA | | EXAMPLE: AUDIO DATA |

FIG.9

| | | SYMBOL | ATTRIBUTE | | PROPERTY |
|---|---|---|---|---|---|
| KEY ADMINISTERED WITHIN MEMORY CARD | | Km | PRIVATE DECRYPTION KEY | | UNIQUE TO EACH MEMORY CARD |
| | | KPm | PUBLIC ENCRYPTION KEY | | DATA ENCRYPTED WITH KPm IS DECRYPTABLE WITH ASYMMETRIC DECRYPTION KEY Km |
| | | Ks2 | SYMMETRIC KEY | UNIQUE TO SESSION | GENERATED FOR EVERY ACCESS BETWEEN MEMORY AND AUDIO REPRODUCTION MODULE |
| KEY ADMINISTERED IN AUDIO REPRODUCTION MODULE | | Kp | PRIVATE DECRYPTION KEY | UNIQUE TO DATA REPRODUCTION APPARATUS (CELLULAR PHONE) | DIFFER FOR EACH DATA REPRODUCTION APPARATUS |
| | | Ks1 | SYMMETRIC KEY | UNIQUE TO SESSION | GENERATED FOR EVERY ACCESS BETWEEN MEMORY AND AUDIO REPRODUCTION MODULE |
| | | KPp | PUBLIC ENCRYPTION KEY | | DATA ENCRYPTED WITH KPp CAN BE DECRYPTED USING ASYMMETRIC DECRYPTION KEY Kp |
| DISTRIBUTION DATA | | Kc | SYMMETRIC KEY | CONTENT KEY | DECRYPTION KEY OF ENCRYPTED CONTENT DATA |
| | | Dc | CONTENT DATA | | EXAMPLE: AUDIO DATA |

FIG. 13

| | SYMBOL | ATTRIBUTE | | PROPERTY |
|---|---|---|---|---|
| KEY ADMINISTERED WITHIN MEMORY CARD | KPma | PUBLIC DECRYPTION KEY | COMMON TO SYSTEM | AUTHENTICATION KEY HAVING CAPABILITY TO VERIFY AUTHENTICATION OF KPp BY DECRYPTION OF {KPp, Crtf} KPma |
| | Ks2 | SYMMETRIC KEY | SESSION KEY | GENERATED FOR EVERY ACCESS BETWEEN MEMORY AND AUDIO REPRODUCTION MODULE |
| KEY ADMINISTERED IN AUDIO REPRODUCTION MODULE | KPp | PUBLIC ENCRYPTION KEY | UNIQUE TO CLASS (TYPE) OF REPRODUCTION APPARATUS | DECRYPTABLE USING ASYMMETRIC PRIVATE DECRYPTION KEY Kp DIFFERING FOR EACH DATA REPRODUCTION APPARATUS OR TYPE OF REPRODUCTION DATA APPARATUS |
| | Kp | PRIVATE DECRYPTION KEY | UNIQUE TO CLASS (TYPE) OF REPRODUCTION APPARATUS | CONVERT INTO PLAINTEXT ENCRYPTED DATE ENCRYPTED USING ASYMMETRIC PRIVATE DECRYPTION KEY Kp DIFFERING FOR EACH DATA REPRODUCTION APPARATUS OR TYPE OF REPRODUCTION DATA APPARATUS |
| | Ks1 | SYMMETRIC KEY | UNIQUE TO SESSION | GENERATED FOR EVERY ACCESS BETWEEN MEMORY CARD AND AUDIO REPRODUCTION MODULE |
| DISTRIBUTION DATA | Kc | SYMMETRIC KEY | CONTENT KEY | DECRYPTION KEY OF ENCRYPTED CONTENT DATA |
| | Dc | DATA | CONTENT DATA | EXAMPLE: AUDIO DATA |

| | SYMBOL | ATTRIBUTE | | PROPERTY |
|---|---|---|---|---|
| KEY ADMINISTERED WITHIN MEMORY CARD | KPma | PUBLIC DECRYPTION KEY | COMMON TO SYSTEM | AUTHENTICATION KEY HAVING CAPABILITY TO VERIFY AUTHENTICATION OF KPp BY DECRYPTION OF {KPp, Crtf} KPma |
| | Ks2 | SYMMETRIC KEY | SESSION KEY | GENERATED FOR EVERY ACCESS BETWEEN MEMORY AND AUDIO REPRODUCTION MODULE |
| KEY ADMINISTERED IN AUDIO REPRODUCTION MODULE | KPp | PUBLIC ENCRYPTION KEY | UNIQUE TO CLASS (TYPE) OF REPRODUCTION APPARATUS | DECRYPTABLE USING ASYMMETRIC PRIVATE DECRYPTION KEY Kp DIFFERING FOR EACH DATA REPRODUCTION APPARATUS OR TYPE OF REPRODUCTION DATA APPARATUS |
| | Kp | PRIVATE DECRYPTION KEY | UNIQUE TO CLASS (TYPE) OF REPRODUCTION APPARATUS | CONVERT INTO PLAINTEXT ENCRYPTED DATE ENCRYPTED USING ASYMMETRIC PRIVATE DECRYPTION KEY Kp DIFFERING FOR EACH DATA REPRODUCTION APPARATUS OR TYPE OF REPRODUCTION DATA APPARATUS |
| | Kcom | PRIVATE DECRYPTION KEY | COMMON TO SYSTEM | DECRYPT ENCRYPTED CONTENT KEY |
| | Ks1 | SYMMETRIC KEY | UNIQUE TO SESSION | GENERATED FOR EVERY ACCESS BETWEEN MEMORY AND AUDIO REPRODUCTION MODULE |
| DISTRIBUTION DATA | Kc | SYMMETRIC KEY | CONTENT KEY | DECRYPTION KEY OF ENCRYPTED CONTENT DATA |
| | Dc | DATA | CONTENT DATA | EXAMPLE: AUDIO DATA |

DATA REPRODUCTION APPARATUS AND DATA REPRODUCTION MODULE

TECHNICAL FIELD

The present invention relates to a reproduction apparatus of data distributed through a data distribution system such as a cellular phone network. More particularly, the present invention relates to a data reproduction apparatus that allows protection on copyrights with respect to distributed data.

BACKGROUND ART

By virtue of the progress in information communication networks and the like such as the Internet in these few years, each user can now easily access network information through individual-oriented terminals employing a cellular phone or the like.

In such information communication, information is transmitted through digital signals. It is now possible to obtain copied audio data and image data transmitted via the aforementioned information communication network without almost no degradation in the audio quality and picture quality of the copied data, even in the case where the copy operation is performed by an individual user.

Thus, there is a possibility of the copyright of the copyright owner being significantly infringed unless some appropriate measures to protect copyrights are taken in the case where any created work subject to copyright protection such as audio data and image data is to be transmitted on such an information communication network.

However, if copyright protection is given top priority so that distribution of copyrighted data through the disseminating digital information communication network is suppressed, the copyright owner who can essentially collect a predetermined copyright royalty for copies of a copyrighted work will also incur some disbenefit.

In the case where copyrighted data such as audio data is distributed through the above-described digital information communication network, each user will reproduce the distributed data using a reproduction apparatus after the distributed data is recorded on some recording device.

Such a recording device includes, for example, a medium that allows data to be written and erased electrically such as a memory card.

As the apparatus to reproduce the distributed data, the cellular phone per se used to receive data distribution can be employed. Alternatively, in the case where the recording device is detachable from the apparatus that receives distribution such as a memory card, a dedicated reproduction apparatus can be used.

In such a case, some security measures must be taken at the recording medium side in order to protect the rights of the copyright owner so that content data (audio data or the like) received by distribution cannot be transferred illegally to another record medium without the permission of the copyright owner.

Furthermore, protection on the rights of the copyright owner and the proper user will be impaired if one other than the user who has received content data distribution by appropriately paying the proper price can freely read out the content data at the reproduction apparatus side during the reproduction of audio data and the like from the recording medium.

DISCLOSURE OF THE INVENTION

An object of the present invention is to provide a data reproduction apparatus with the capability of preventing any unauthorized user from accessing copyrighted data such as audio data distributed and stored in a recording device in the reproduction apparatus that reproduces copyrighted data.

To achieve the above object, a data reproduction apparatus of the present invention decrypts encrypted content data to reproduce the content data, and includes a data storage unit and a data reproduction unit.

The data storage unit stores encrypted content data and an encrypted content key that is an encrypted version of the content key used to decrypt the encrypted content data.

The data reproduction unit receives an output from the data storage unit to reproduce encrypted content data. The data reproduction unit includes a first key hold unit, a first decryption processing unit, and a second decryption processing unit.

The first key hold unit stores a first decryption key used to decrypt the encrypted content key read out from the data storage unit. The first decryption processing unit extracts a content key by carrying out a decryption process by the output from the first key hold unit based on the encrypted content key from the data storage unit. The second decryption processing unit receives the encrypted content data read out from the data storage unit to decrypt the data according to the output of the first decryption processing unit to extract content data.

According to the data reproduction apparatus of the present invention, it is difficult for a third party to improperly access distribution data as to content data stored in a memory by a proper user. It is therefore possible to prevent the copyright owner or proper user from incurring disbenefit by an improper process carried out without permission.

BRIEF DESCRIPTION OF THE DRAWINGS

FIG. 5 is a diagram to describe together the characteristics of key data and the like for communication used in cellular phone 200 of FIG. 4.

FIG. 9 is a diagram to describe together characteristics of key data and the like for communication used in cellular phone 300 shown in FIG. 8.

FIG. 13 is a diagram to describe together characteristics of key data and the like for communication used in cellular phone 400 shown in FIG. 12.

FIG. 19 is a schematic block diagram to describe a structure of a cellular phone 600 according to a sixth embodiment of the present invention.

FIG. 20 is a diagram to describe together characteristics of key data and the like for communication used in cellular phone 600 shown in FIG. 19.

BEST MODE FOR CARRYING OUT THE INVENTION

Embodiments of the present invention will be described hereinafter with reference to the drawings.

First Embodiment

Entire Structure of System

Figure 1:
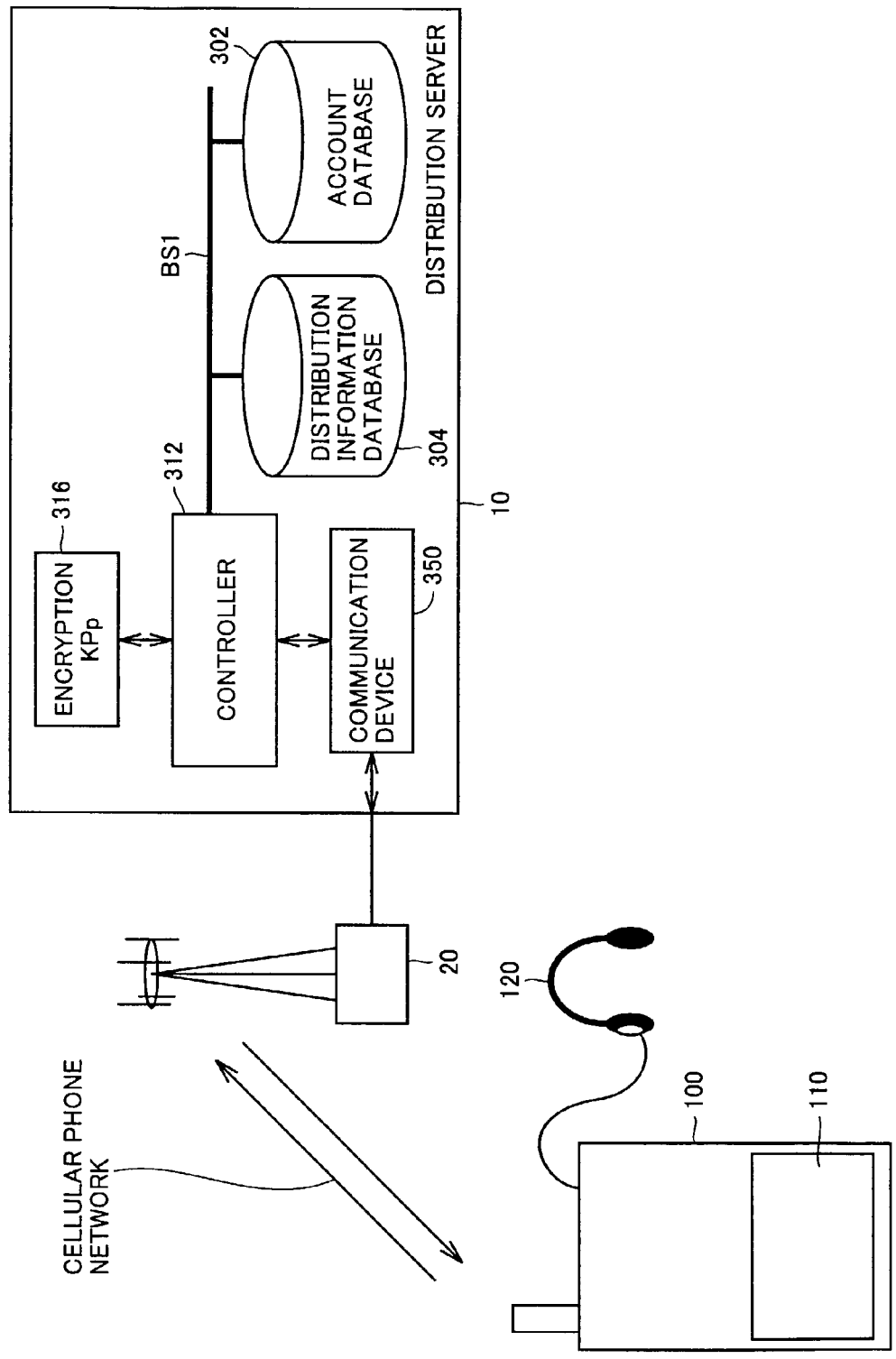
FIG. 1 is a schematic diagram to describe an entire structure of an information distribution system of the present invention.

FIG. 1 is a schematic diagram to describe an entire structure of an information distribution system of the present invention.

The present invention is based on a structure of a data distribution system that distributes encrypted audio data to each user via a cellular phone network. However, it will become apparent from the following description that the present invention is not limited to such a case. Other encrypted copyright information data, for example copyrighted information data such as image data, can be decrypted and converted into plaintext for reproduction.

Here, it is assumed that the cellular phone network also includes simple portable telephone networks such as of PHS (Personal Handy Phone).

Referring to FIG. 1, a distribution server 10 that administers audio data subject to copyright protection encrypts audio data (also called "content data" hereinafter) according to a predetermined cryptographic scheme, and provides the encrypted data to a cellular phone company serving as a distribution carrier 20 to distribute information.

Distribution carrier 20 relays through its own cellular telephone network a distribution request from each user to distribution server 10. In response to the distribution request, distribution server 10 distributes the requested encrypted audio data to the cellular phone of the relevant user via the cellular phone network of cellular phone company 20 to provide the content data.

A user 1, for example, can listen to the audio data reproduced via a headphone 140 or the like connected to cellular phone 100.

Such a distribution server 10 and distribution carrier (cellular phone company) 20 are together generically referred to as a music server 30 hereinafter.

The process of transmitting audio data from such a music server 30 to each cellular phone terminal is referred to as "distribution".

By counting the number of times of distributing audio data of, for example, one song, at distribution carrier 20, and collecting the copyright fee incurred every time a user receives (downloads) content data in the form of a telephone bill for the cellular phone, the copyright fee of the copyright owner can be ensured.

Furthermore, since distribution of copyrighted data is conducted through a cellular phone network which is a closed system, there is the advantage that measures to protect copyrights can be taken more easily that compared to an open system such as the Internet.

Structure of Distribution Server 10

Referring to FIG. 1, a distribution server 10 includes a distribution information database 304 to store distribution information such as encrypted content data which is an encrypted version of audio data (content data) according to a predetermined scheme, a content key and the like, an account database 302 to store accounting information according to the number of accesses to the audio data for each user, a content key encryption processing unit 316 to encrypt using a public encryption key KPp a content key Kc directed to decrypt encrypted content data, a controller 312 to transmit/receive data to/from distribution information database 304 and account database 302 via a data bus BS1 to control the operation of distribution server 10, and a communication device 350 to transfer data between distribution server 10 and distribution carrier 20 through a communication network.

Specifically, encrypted content data [Dc] Kc corresponding to content data Dc encrypted into a state that can be decrypted using content key Kc which is the decryption key and also content key Kc are output from distribution information database 304. Controller 312 controls content key encryption processing unit 316 so that [Kc] Kp corresponding to content key Kc encrypted using public encryption key KPp is applied to distribution carrier 20 via communication device 350.

Here, the expression [Y] X implies that data Y is data converted into encryption that can be decrypted using a key X. The keys used in the encryption process and decryption process are also generically referred to as "key".

Structure of Terminal (Cellular Phone)

Figure 2:
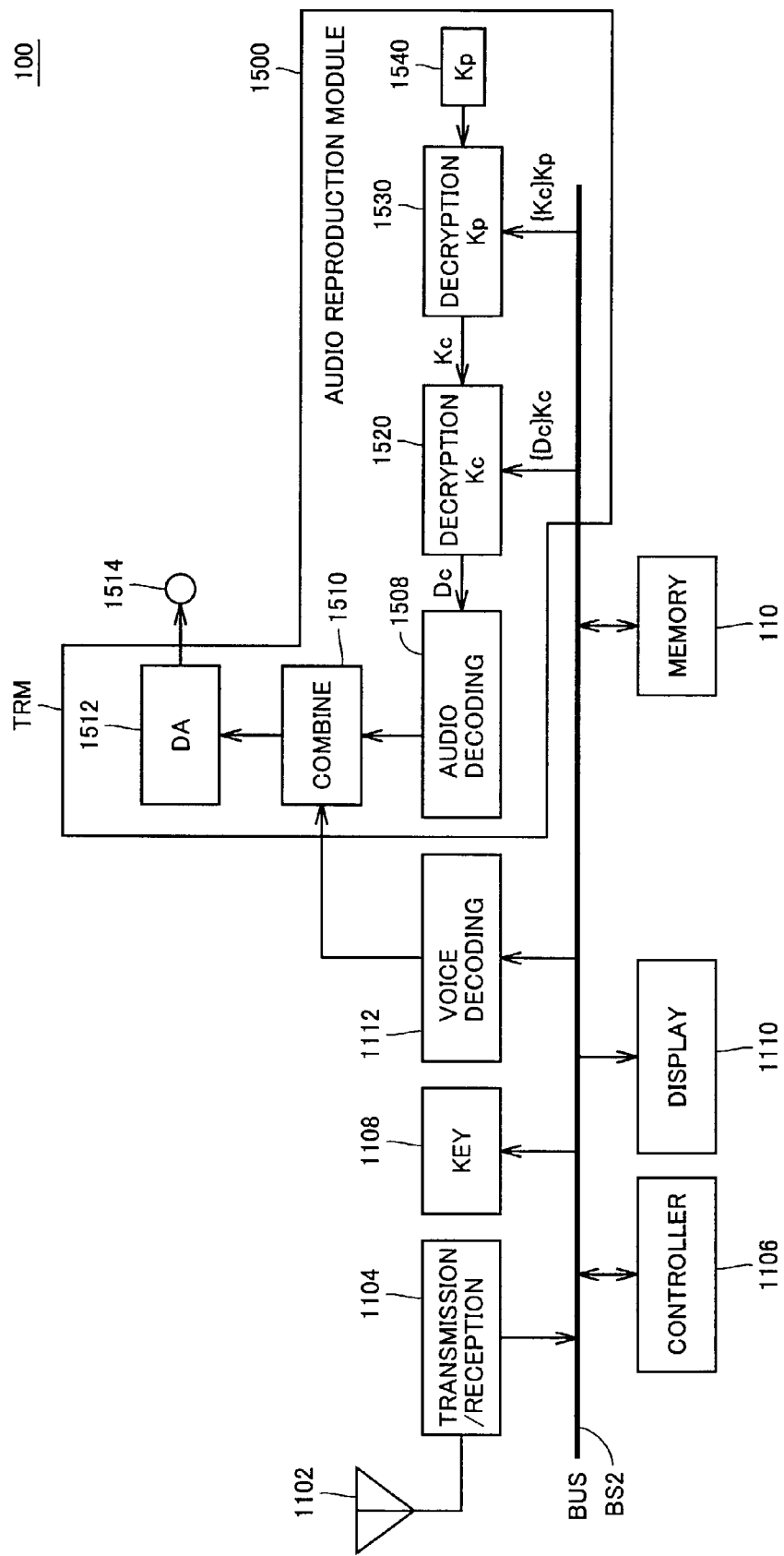
FIG. 2 is a schematic block diagram to describe a structure of a cellular phone 100 of FIG. 1.

FIG. 2 is a schematic block diagram to describe a structure of a cellular phone 100 shown in FIG. 1.

Cellular phone 100 includes an antenna 1102 to receive signals transmitted through radio by a cellular phone network, a transmitter/receiver unit 1104 converting received signals from antenna 1102 into baseband signals, or modulating and providing to antenna 1102 the data from a cellular phone, a data bus BS2 to transfer data among each component in cellular phone 100, a controller 1106 with a touch key, a dial key, or the like to control the operation of cellular phone 100 via data bus BS2, a keyboard 1108 to apply a command from an external source to cellular phone 100, a display 1110 to provide the information output from controller 1106 and the like to the user as visual information, and an voice decoding unit 1112 to reproduce audio based on reception data applied via data bus BS2 in a normal conversation mode.

Cellular phone 100 further includes a memory 110 to store encrypted content data [Dc] Kc and encrypted content key [Kc] Kp from server 30, and an audio reproduction module 1500. Audio reproduction module 1500 includes a Kp hold unit 1540 storing a private decryption key Kp, corresponding to a public encryption key KPp, and used to decrypt data encrypted with key KPp, a decryption processing unit 1530 to decrypt using public encryption key KPp transmitted from music server 30 an encrypted content key [Kc] Kp received from memory 110, a decryption processing unit 1520 to decrypt encrypted content data [Dc] Kc distributed from music server 30 and stored in memory 110 using content key Kc that is decrypted and extracted by decryption processing unit 1530, an audio decoding unit 1508 receiving the decrypted content data from decryption processing unit 1520 to reproduce audio data according to a reproduction procedure of the coding scheme used to code the content data, for example the digital compression coding method such as MP3 (MPEG1 Audio Layer III) and AC3, a combine unit 1510 to receive the output of audio decoding unit 1508 and the output of voice decoding unit 1112 to selectively provide the output or combine the outputs according to the operation mode, and a digital-analog converter 1512 to convert the received output from combine unit 1510 into analog signals for output.

Cellular phone 100 further includes a connection terminal 1514 to receive the output of digital-analog converter 1512 and for connection with a headphone 140.

For the sake of simplification, only the block related to distribution of audio data of the present invention is depicted. The block related to the conversation capability inherent in a cellular phone is partially not illustrated.

According to the structure of FIG. 2, audio decoding unit 1508, Kp hold unit 1540, decryption processing unit 1530 and decryption processing unit 1520 can be incorporated into a module TRM to disable read out by a third party of data and the like in the circuitry residing in the region by erasing internal data or destroying the internal circuitry at an attempt of an improper opening process or the like by an external source. This module is generally referred to as a tamper resistance module.

By such a structure, at least the decryption key and the data in plaintext cannot be looked from an external source. It will become difficult to improperly obtain the encryption scheme and private decryption key of cellular phone 100 from an external source. Therefore, the security is improved.

It is possible to set audio reproduction module 1500 corresponding to the region enclosed by a solid line in FIG. 2 as the TRM. By such a structure, even the eventual digital data of the copyrighted data such as audio data can be protected.

Reproduction Process

Figure 3:
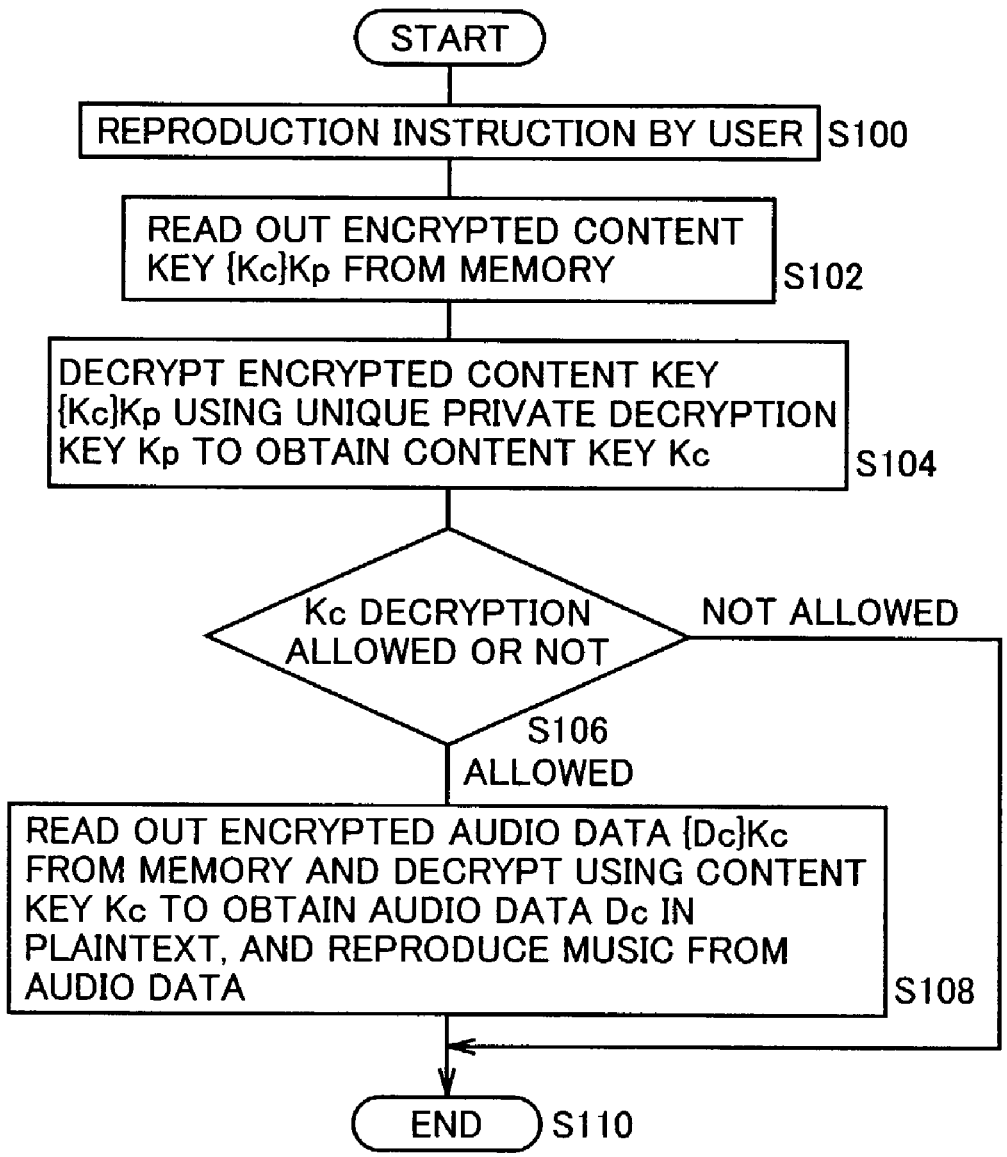
FIG. 3 is a flow chart to describe a reproduction process to reproduce music from encrypted content data in cellular phone 100.

FIG. 3 is a flow chart to describe a reproduction process of decrypting content data from the encrypted content data stored in memory 110 to provide music.

Referring to FIG. 3, a reproduction request is applied to controller 1106 in response to a user's command through keyboard 1108 or the like of a cellular phone (step S100).

In response to this reproduction request, controller 1106 controls memory 110 so as to read out encrypted content key [Kc] Kp (step S102).

Then, decryption processing unit 1530 applies a decryption process on encrypted content key [Kc] Kp read out from memory 110 (step S104).

In the case where content key Kc can be decrypted and extracted by decryption processing unit 1530 (step S106), control proceeds to the next step. In the case where determination is made that the content key is not decryptable, the process ends (step S10).

In the case where content key Kc can be decrypted and extracted by decryption processing unit 1530, controller 1108 controls memory 110 so that encrypted content data [Dc] Kc is read out. This encrypted content data [Dc] Kc is applied to decryption processing unit 1520. Decryption processing unit 1520 applies a decryption process using decryption key Kc to generate content data Dc in plaintext. This content data Dc is applied to audio decoding unit 1508. At audio decoding unit 1508, the music signal reproduced based on content data Dc is passed through combine unit 1510 to be converted into an analog signal by digital-analog converter 1512. The converted analog signal is output from connection terminal 1514.

According to the above-described structure, only encrypted content data and an encrypted content key are stored in memory 110 in cellular phone 100 which is a reproduction apparatus. Therefore, even if the stored contents in memory 110 is read out by a third party, the music cannot be reproduced.

It is to be noted that the data applied from memory 110 to decryption processing units 1520 and 1530 are such encrypted data. Therefore, even if the signals on data bus BS2 are read out by a third party, the music cannot be reproduced.

The portion to which audio data in plaintext is transmitted is formed of a tamper resistance module. Therefore, it is not possible to read out the audio data from this area outside to an external source.

According to the structure of cellular phone 100 shown in FIG. 2, protection can be conducted so as to prevent the content data from being copied by unauthorized means for reproduction or distribution.

Second Embodiment

Figure 4:
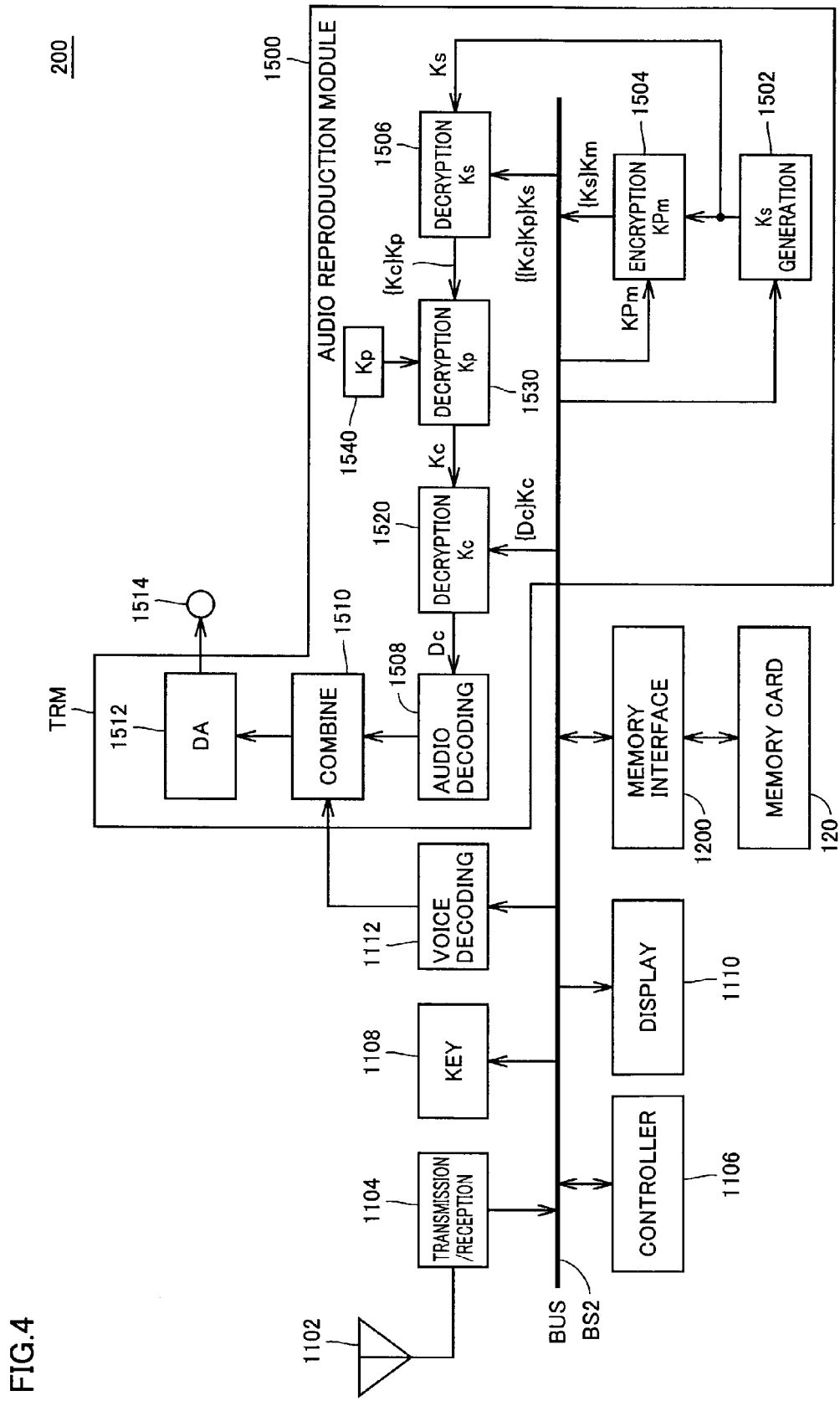
FIG. 4 is a schematic block diagram to describe a structure of a cellular phone 200 according to a second embodiment of the present invention.

FIG. 4 is a schematic block diagram to describe a structure of a cellular phone 200 according to a second embodiment of the present invention. FIG. 4 is comparable with FIG. 2 of the first embodiment.

The difference in structure of cellular phone 200 from cellular phone 200 of FIG. 2 is set forth below.

Referring to FIG. 4, cellular phone 200 has a structure in which a memory card 120 can be loaded. This detachable memory card 120 functions to receive and store encrypted content data received by cellular phone 200, and apply a predetermined encryption process on the encrypted content data and encrypted content key to provide the processed data and key to audio reproduction module 1500. Accordingly, cellular phone 200 further includes a memory interface 1200 to control data transfer between memory card 1200 and data bus BS2.

In cellular phone 200, the structure of audio reproduction module 1500 differs from that of cellular phone 200.

Specifically, audio reproduction module 1500 of cellular phone 200 includes a session key generation unit 1502 to generate through a random number or the like a session key Ks used to encrypt data transferred on data bus BS2 during the data transfer between memory card 120 and other components in cellular phone 200, an encryption processing unit 1504 to encrypt session key Ks generated by session key generation unit 1502 to provide the encrypted session key onto data bus BS2, a decryption processing unit 1506 decrypting for session key Ks a content key Kc transmitted from memory card 120 through data bus BS2, encrypted with public encryption key KPp and session key Ks for output, a Kp hold unit 1540 storing a private decryption key Kp, corresponding to a public encryption key KPp, and used to decrypt data encrypted with key KPp, a decryption processing unit 1530 receiving the output of decryption processing unit 1506 to decrypt encrypted content key [Kc] Kp using public encryption key KPp transmitted from memory card 120, a decryption processing unit 1520 to decrypt encrypted content data [Dc] Kc distributed from server 30 and stored in memory card 120 based on content key Kc decrypted and extracted by decryption processing unit 1530, an audio decoding unit 1508 receiving decrypted content data Dc from decryption processing unit 1520 to reproduce audio data distributed from music server 30, a combine unit 1510 receiving the output of audio decoding unit 1508 and the output of voice decoding unit 1112 to selectively output or combine the outputs according to the operation mode, and a digital-analog converter 1512 to convert the received output from combine unit 1510 into an analog signal for output.

The other components in cellular phone 200 are similar in structure to those of cellular phone 100 of the first embodiment. Corresponding components have the same reference characters allotted, and description thereof will not be repeated.

In FIG. 4, only the block related to distribution of the audio data of the present invention is depicted for the sake of simplification. The block related to the conversation feature inherent to a cellular phone is partially not illustrated.

According to the structure of FIG. 4, audio decoding unit 1508, Kp hold unit 1540, decryption processing unit 1530, decryption processing unit 1520, decryption processing unit 1506, encryption processing unit 1504 and Ks generation unit 1502 can be incorporated into a TRM.

By such a structure, it is difficult for a third party to improperly obtain the encryption scheme and private decryption key of cellular phone 200 since the decryption key and data in plaintext cannot be looked from an external source. Therefore, the security is improved.

Furthermore, audio reproduction module 1500 corresponding to the region enclosed by a solid line in FIG. 4 can be set as the TRM. According to the structure, protection can be conducted even on the eventual digital data of the copyrighted content data such as audio data.

Structure of Encryption/Decryption Key

FIG. 5 is a diagram to describe together characteristics of key data and the like for communication used in cellular phone 200 shown in FIG. 4.

In the structure of FIG. 4, the keys to control data processing in memory card 120 include a public encryption key KPm unique to memory card 120 and a private decryption key Km asymmetric to key KPm and used to decrypt data encrypted with public encryption key KPm.

The expression of key KPm and key Km being asymmetric means that data encrypted using a plurality of public encryption keys KPm can be decrypted using a decryption key Km that is different from key KPm and that cannot be easily obtained by analogy.

Therefore, in the transfer of a session key between memory card 120 and cellular phone 200, these encryption key Km and decryption key KPm will be used as described afterwards.

Additionally, the encryption keys used to maintain secrecy in the data transfer with respect to an external source of the memory card include a public encryption key KPm unique to the reproduction apparatus which is a cellular phone here, a private decryption key Kp asymmetric to key KPp, functioning as a key to control the audio reproduction module, and used to decrypt data encrypted with public encryption key KPp, and a symmetric key Ks generated at a Ks generator 150 for every communication.

Symmetric key Ks is generated by Ks generator 1502 every time access is effected for the transfer of content data between, for example, cellular phone 200 and memory card 120.

In the following, this unit of communication or unit of one access is called "session", and symmetric key Ks is also referred to as "session key".

Session key Ks has a value unique to each communication session, and is under control of audio reproduction module 1500.

With regards to copyrighted data stored in memory card 120, there is a content key Kc which is a symmetric key to encrypt content data (audio data) per se. It is assumed that the encrypted content data is decrypted (converted in plaintext) using this content key Kc.

Content data Dc subject to copyright protection includes, for example, audio data. Data corresponding to the content data that can be decrypted using content key Kc is called encrypted content data [Dc] Kc.

In the case where content key Kc is distributed from distribution server 10 to cellular phone 200, it is assumed that content key Kc is encrypted using at least public encryption key KPp, and stored in memory card 120 as encrypted content key [Kc] Kp.

Structure of Memory Card

Figure 6:
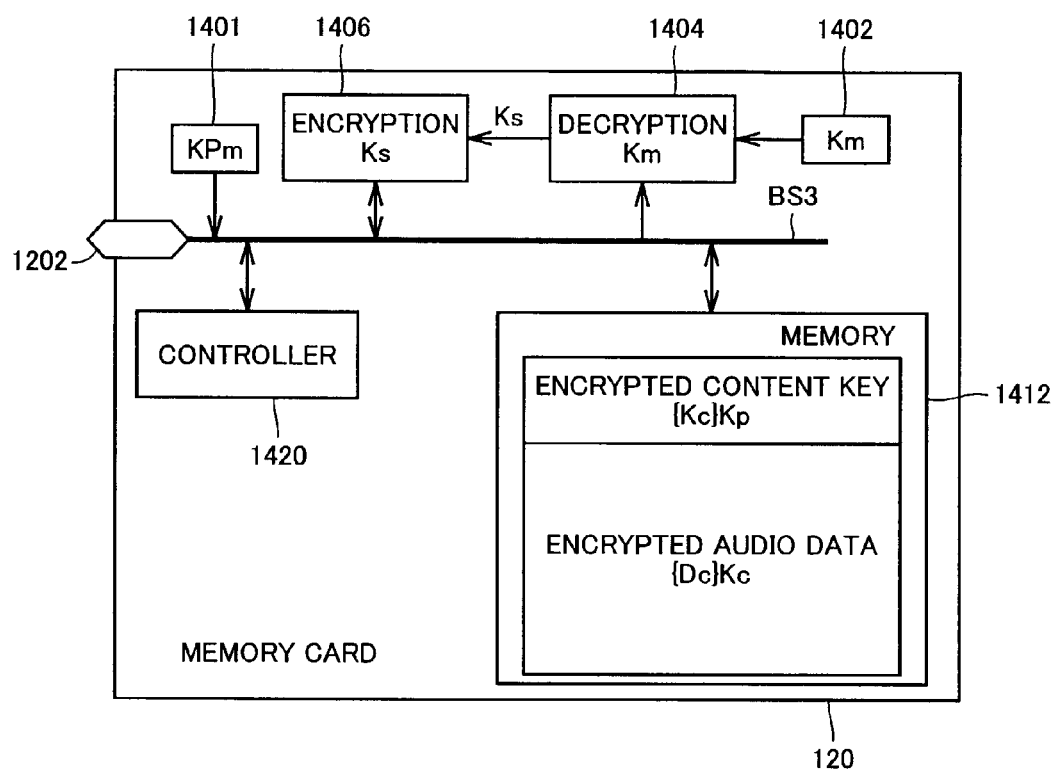
FIG. 6 is a schematic block diagram to describe a structure of a memory card 120 shown in FIG. 4.

FIG. 6 is a schematic block diagram to describe a structure of memory card 120 shown in FIG. 4.

Memory card 120 includes a data bus BS3 to send/receive a signal to/from memory interface 1200 via terminal 1202, a KPm hold unit 1401 storing a value of public encryption key KPm and providing public encryption key KPm onto data bus BS3, a Km hold unit 1402 to store a private decryption key Km corresponding to card 120, a decryption processing unit 1404 to extract a session key Ks by applying a decryption process on data applied onto data bus BS3 from memory interface 1200 using private decryption key Km, a memory 1412 receiving and storing content key Kc that is encrypted using public encryption key Kp and encrypted content data [Dc] Kc encrypted using content key Kc, an encryption processing unit 1406 encrypting and providing onto data bus BS3 the output from memory 1412 based on session key Ks extracted by decryption processing unit 1404, and a controller 1420 to control the operation of the memory card 120.

Memory card 120 of FIG. 6 can have a structure that is incorporated into module TRM to disable readout by a third party of data and the like in the circuitry residing in this region by erasing internal data or destroying internal circuitry at an attempt of an improper opening process or the like by an external source.

Reproduction Process

Figure 7:
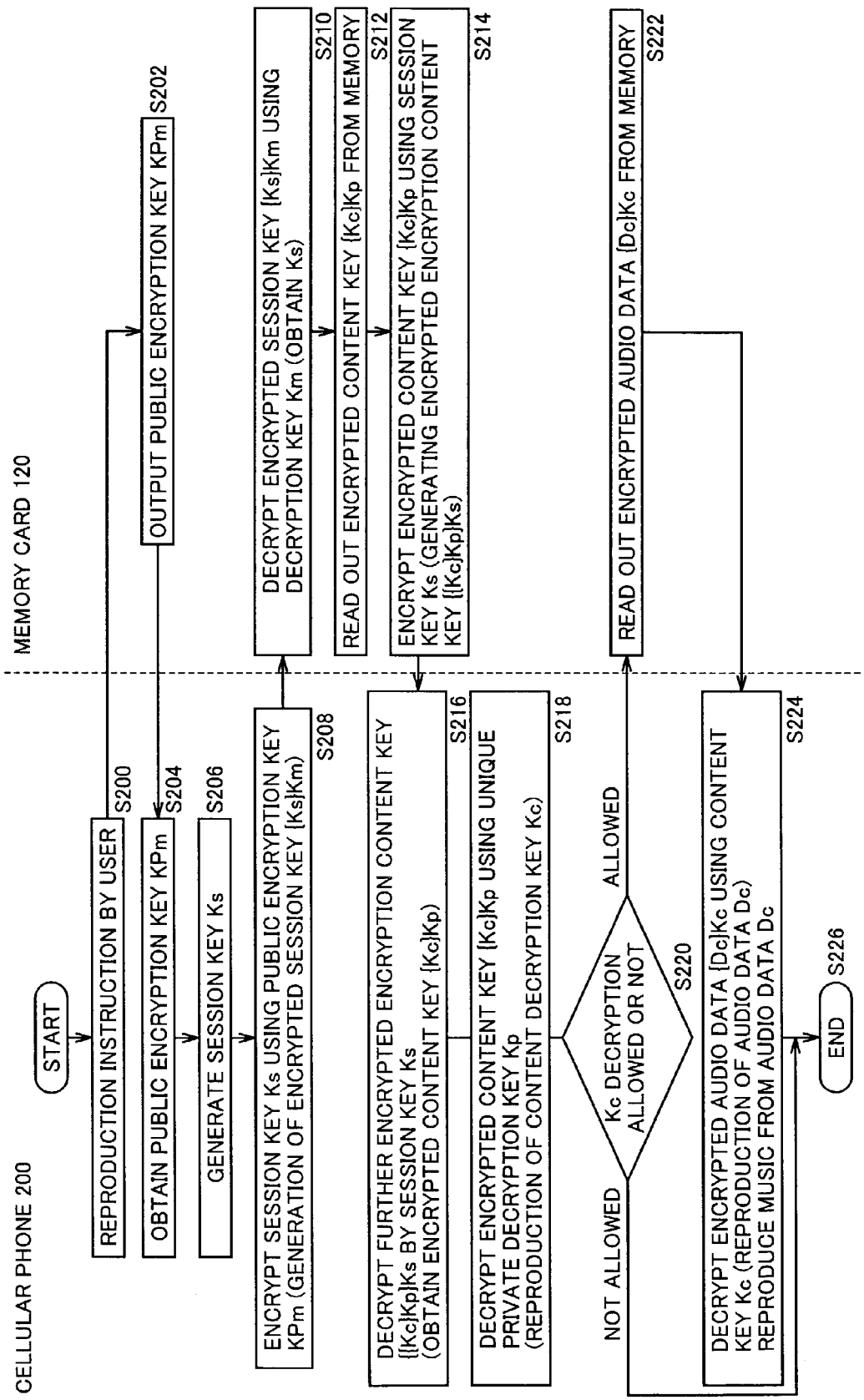
FIG. 7 is a flow chart to describe a reproduction process to reproduce music from encrypted content data in cellular phone 200.

FIG. 7 is a flow chart to describe a reproduction process to decrypt music information from the encrypted content data stored in memory card 120 to output music.

Referring to FIG. 7, in response to a user's command through keyboard 1108 or the like of a cellular phone, a reproduction request is output to memory card 120 (step S200).

In response to this reproduction request, control 1420 in memory card 120 transmits public encryption key KPm from KPm hold unit 1401 to cellular phone 200 via data bus BS3, terminal 1202 and memory interface 1200 (step S202).

Upon receiving key KPm from card 120 in cellular phone 200 (step S204), Ks generation unit 1502 generates a session key Ks (step S206). Encryption processing unit 1504 encrypts session key Ks using key KPm to generate an encrypted session key [Ks] KPm. Encrypted session key [Ks] KPm is transmitted to card 120 via data bus BS2 (step S208).

Memory card 120 receives the generated encrypted session key [Ks] KPm from cellular phone 200. Encrypted session key [Ks] KPm is decrypted using private decryption key Km at decryption processing unit 1404, whereby session key Ks is extracted (step S210).

Then, memory card 120 reads out content key [Kc] Kp from memory 1412 (step S212).

Memory card 120 uses session key Ks extracted from encryption processing unit 1406 to encrypt encrypted content key [Kc] Kp, and applies the further encrypted encryption content key [[Kc] Kp] Ks onto data bus BS2 (step S214).

Decryption processing unit 1506 of cellular phone 200 applies a decryption process on encrypted encryption content key [[Kc] Kp] Ks transmitted from memory card 120 by session key Ks, whereby encrypted content key [Kc] Kp is obtained (step S216).

Decryption processing unit 1530 of cellular phone 200 applies a decryption process on data [Kc] Kp based on key Kp from Kp hold unit 1540 (step S218).

When content key Kc can be extracted by this decryption process of decryption processing unit 1530 (step S220), control proceeds to step S222, otherwise (step S220), the process ends (step S226).

When content key Kc is extracted by the decryption process of decryption processing unit 1530, memory card 120 reads out encrypted content data [Dc] Kc from memory 1412 and provides the same onto data bus BS2 (step S222).

Decryption processing unit 1520 of cellular phone 200 applies a decryption process on encrypted content data [Dc] Kc by the extracted content key Kc to generate content data Dc in plaintext. Audio decoding unit 1508 reproduces content data Dc and applies the reproduced content data Dc to combine unit 1510. Digital-analog converter 1512 converts the received data from combine unit 1510 into an analog signal to output reproduced music. Thus, the process ends (step S226).

By the above-described structure, transmission from memory card 120 to cellular phone 200 is effected to carry out a reproduction operation after the content key has been encrypted based on the session key generated at cellular phone 200.

According to cellular phone 200 of the second embodiment, distribution data is stored in a memory card that is detachable with respect to cellular phone 200. The memory card has to be loaded only when distribution is to be received or reproduction is to be carried out. Therefore, there is the advantage that the convenience as a portable apparatus is not degraded from the standpoint of weight and the like, in addition to the advantage described with reference to cellular phone 200 of the first embodiment.

The data transferred between a cellular phone and a memory card is in an encrypted form using a session key. Therefore, the security with respect to data is improved to allow protection on both the rights of the copyright owner and the user.

Subsequent to distribution, reproduction is allowed by loading the memory card in another reproduction apparatus. Therefore, the degree of freedom as to the usage of audio data for the user is improved.

Third Embodiment

Figure 8:
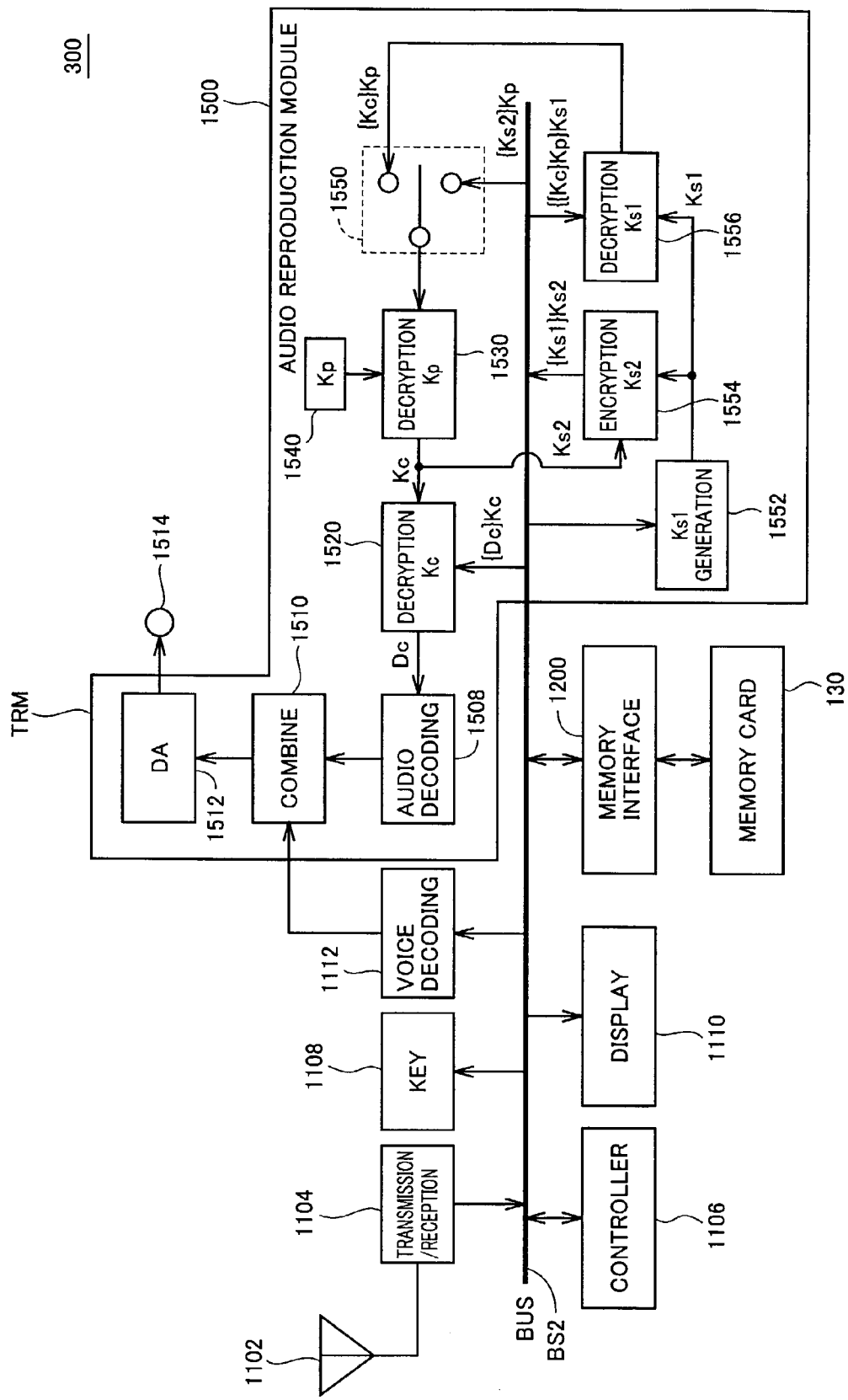
FIG. 8 is a schematic block diagram to describe a structure of a cellular phone 300 according to a third embodiment of the present invention.

FIG. 8 is a schematic block diagram to describe a structure of a cellular phone 300 according to a third embodiment of the present invention. FIG. 8 is comparable with FIG. 4 corresponding to the second embodiment.

Cellular phone 300 of the third embodiment shown in FIG. 8 differs in structure from cellular phone 2 of the second embodiment as set forth below.

In FIG. 8, cellular phone 300 can be loaded with a detachable memory card 130 receiving and storing encrypted audio data received by cellular phone 300, and further applying a predetermined encryption process on the encrypted content data and encrypted content key to provide the encrypted content data and encrypted content key that are further encrypted to audio reproduction module 1500 in cellular phone 300.

As will be described afterwards, memory card 130 differs from memory card 120 in that a session key Ks2 is generated by memory card 130 itself.

Furthermore, cellular phone 300 differs from cellular phone 200 in the structure of audio reproduction module 1500.

Specifically, audio reproduction module 1500 of cellular phone 300 includes a session key generation unit 1522 generating, using a random number or the like, a session key Ks1 directed to encrypt data transferred on data bus BS2 for the data transfer between memory card 130 and other components in cellular phone 300, an encryption processing unit 1554 encrypting session key Ks1 generated by session key generation unit 1552 with session key Ks2 from memory card 130 and apply the encrypted session key onto data bus BS2, a decryption processing unit 1556 decrypting for session key Ks1 an encrypted content key Kc that is transmitted from memory card 130 through data bus BS2 and that is encrypted with public encryption key KPp and session key Ks1, and a switch circuit 1550 under control of controller 1106 to apply encrypted session key [Ks2] Kp of memory card 130 transmitted via data bus BS2 or encrypted content key [Kc] Kp output from decryption processing unit 1556 to decryption processing unit 1530 directed to decrypt data encrypted with public encryption key KPp.

Encryption processing unit 1554 receives session key Ks2 of memory card 130 decrypted and extracted from decryption process unit 1530 using private decryption key Kp, and applies an encryption process on session key Ks1 generated by session key generation unit 1552 using session key Ks2.

The remaining component of cellular phone 300 are similar to those of cellular phone 200 of the second embodiment. Corresponding components have the same reference characters allotted, and the description thereof will not be repeated.

For the sake of simplification, only the block related to distribution of audio data of the present invention is depicted in FIG. 8. The block related to the conversation function inherent to a cellular phone is partially not illustrated.

In the structure shown in FIG. 8, audio decoding unit 1508, Kp hold unit 1540, decryption processing unit 1530, decryption processing unit 1520, decryption processing unit 1556, encryption processing unit 1554, session key generation unit 1552 and switch circuit 1550 can be incorporated into the TRM.

By the above-described structure, the decryption key and data converted into plaintext cannot be looked from an external source. It will become difficult to improperly obtain the encryption scheme and private decryption key of cellular phone 300 by a third party. Therefore, the security is improved.

Furthermore, audio reproduction module 1500 corresponding to the region enclosed by a solid line in FIG. 8 can be set as the TRM. In this case, the eventual digital data of content data subjected to copyright protection such as audio data can also be protected.

Structure of Encryption/Decryption Key

FIG. 9 is a diagram to describe together the characteristics of key data for communication employed in cellular phone 300 of FIG. 8.

The key to control data processing in memory card 130 according to the structure of FIG. 8 includes a public encryption key KPm unique to the memory card, a private decryption key Km asymmetric to key KPm and used to decrypt data encrypted with public encryption key KPm, and a session key Ks2 generated by memory card 130 and unique to each session.

In the transfer of a session key between memory card 130 and cellular phone 300, private key Km, decryption key KPm, and session key Ks2 will be employed, as will be described afterwards.

Also, the encryption key to maintain security as to data transfer from an external source to memory card 130 includes a public encryption key KPp unique to the reproduction apparatus which is a cellular phone here, distributed together with the content data at the time of distribution of the content data, and stored in memory card 130 as will be described afterwards, a private decryption key Kp asymmetric to key KPp and used as the key to decrypt data encrypted with key KPp as a control key of audio reproduction module 1500, and a session key Ks1 which is a symmetric key generated by session key generator 1552 for each access.

Session key Ks1 has a value unique to each communication session, and is under control of audio reproduction module 1500.

With regards to copyrighted data recorded in memory card 130, it is assumed that the encrypted content data is decrypted (converted into plaintext) using a content key Kc that is the symmetric key directed to encrypt audio data (content data) per se.

In the case where content key Kc is distributed from distribution server 10 towards cellular phone 300, it is assumed that content key Kc is at least encrypted with public encryption key KPp, and stored in memory card 130 as encrypted content key [Kc] Kp.

Furthermore, it is assumed that content data Dc subject to copyright protection is stored in memory card 130 as encrypted content data [Dc] Kc that can be decrypted using content key Kc.

Structure of Memory Card

Figure 10:
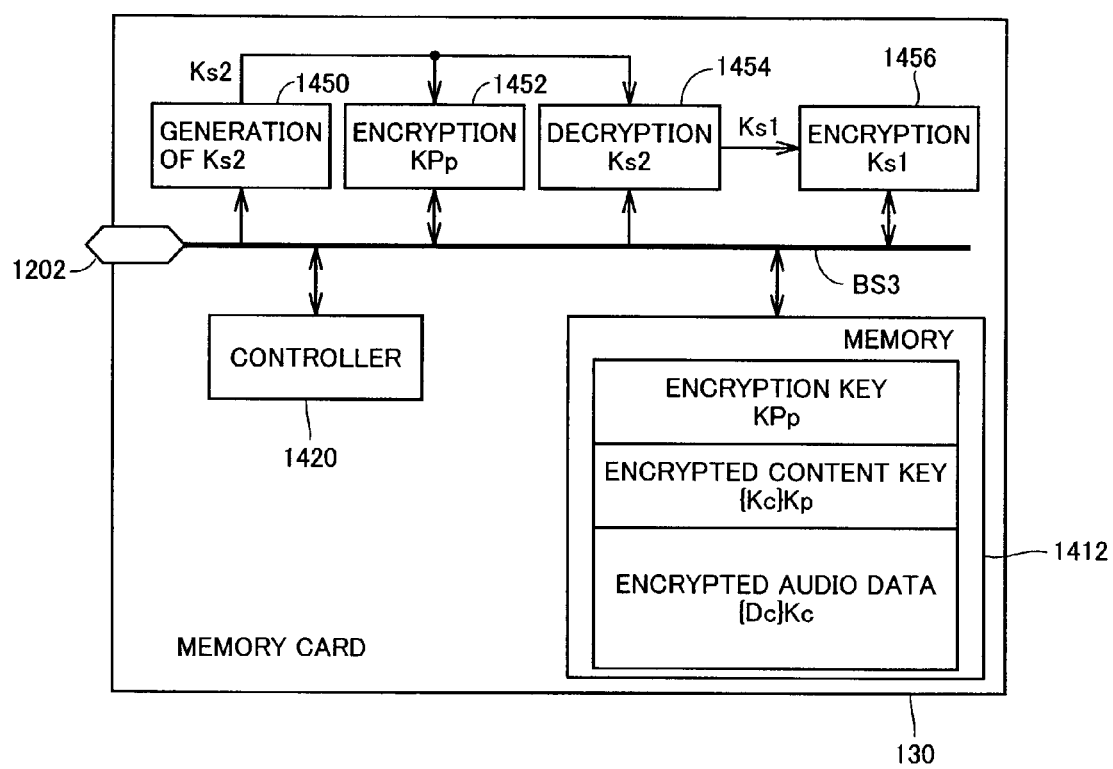
FIG. 10 is a schematic block diagram to describe a structure of memory card 130 shown in FIG. 8.

FIG. 10 is a schematic block diagram to describe a structure of memory card 130 shown in FIG. 8.

Memory card 130 includes a data bus BS3 to send/receive a signal to/from memory interface 1200 via terminal 1202, a session key generation unit 1450 to generate a session key Ks2 for every session, an encryption processing unit 1452 to encrypt session key Ks2 using public encryption key KPp and providing the encrypted session key onto data bus BS3, a decryption processing unit 1454 to extract session key Ks1 from cellular phone 300 by applying a decryption process on data [Ks] Ks2 applied onto data bus BS3 from memory interface 1200 using session key Ks2, a memory 1412 receiving and storing via data bus BS3 a public encryption key KPp, a content key [Kc] Kp encrypted with public encryption key KPp and encrypted content data [Dc] Kc encrypted by a content key Kc, an encryption processing unit 1456 to encrypt the output from memory 1412 based on session key Ks1 extracted from decryption processing unit 1454 to provide the encrypted data onto data bus BS3, and a controller 1420 to control the operation of memory card 130.

Memory card 130 of FIG. 10 can be incorporated into module TRM to disable readout by a third party of data and the like in the circuitry residing in this region by erasing internal data or destroying internal circuitry at an attempt of an improper opening process or the like by an external source.

Reproduction Process

Figure 11:
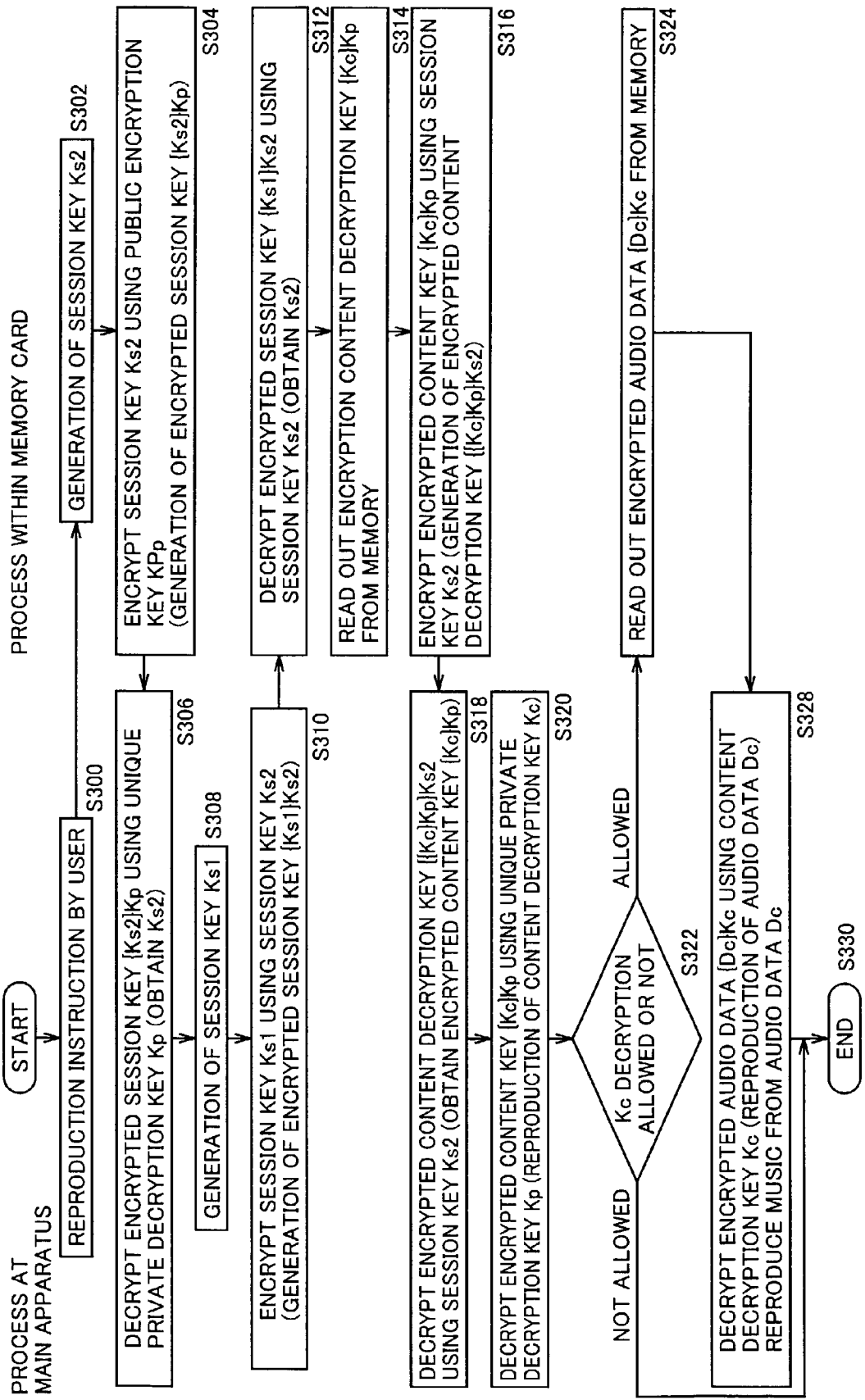
FIG. 11 is a flow chart to describe a reproduction process to reproduce music from encrypted content data within cellular phone 300.

FIG. 11 is a flow chart to describe a reproduction process of decrypting music information from encrypted content data stored in memory card 130 for output as music.

Referring to FIG. 11, a reproduction request is output to memory card 130 by a user's command through keyboard 1108 or the like of cellular phone 300 (step S300).

In response to this reproduction request, controller 1420 in memory card 130 causes session key generator 1450 to generate a session key Ks2 (step S302). Under control of controller 1420, encryption processing unit 1452 encrypts session key Ks2 using public encryption key KPp to generate an encrypted session key [Ks2] Kp. This encrypted session key [Ks2] Kp is transmitted to cellular phone 300 via data bus BS3, terminal 1202 and memory interface 100 (step S304).

Upon receiving encrypted session key [Ks2] Kp from memory card 130, decryption processing unit 1530 of cellular phone 300 receives and decrypts encrypted session key [Ks2] Kp via switch circuit 1550 to obtain session key Ks2 (step S306).

Session key generation unit 1552 of cellular phone 300 generates a session key Ks2 (step S308). Encryption processing unit 1554 encrypts this session key Ks1 using session key Ks2 extracted at step S306 to generate an encrypted session key [Ks1] Ks2. This encrypted session key [Ks1] Ks2 is transmitted to card 130 through data bus BS2 (step S310).

Memory card 130 receives session key [Ks1] Ks2 generated and encrypted by cellular phone 300. Decryption processing unit 1454 applies decryption using session key Ks2 to extract session key Ks1 (step S312).

Then, memory card 130 reads out encrypted content key [Kc] Kp from memory 1412 (step S314). Encryption processing unit 1456 encrypts encrypted content key [Kc] Kp using extracted session key Ks1. The further encrypted content data [[Kc] Kp] Ks1 is applied onto data bus BS2 via data bus BS3 and the like (step S316).

Decryption processing unit 1556 of cellular phone 300 applies a decryption process on further encrypted content key [[Kc] Kp] Ks1 transmitted from memory card 130 using session key Ks1, whereby encrypted content key [Kc] Kp is obtained (step S318).

Decryption processing unit 1530 of cellular phone 300 receives encrypted content key [Kc] Kp via switch circuit 1550 to apply a decryption process on encrypted content key [Kc] Kp based on key Kp from Kp hold unit 1540 (step S320).

When content key Kc can be extracted by the decryption process of decryption processing unit 1530 (step S322), control proceeds to step S324. In the case where content key Kc cannot be extracted (step S322), the process ends (step S330).

When content key Kc is extracted by the decryption process of decryption processing unit 1530, memory card 130 reads out encrypted content data [Dc] Kc from memory 1412. The read out encrypted content data [Dc] Kc is applied onto data bus BS2 via data bus BS3 and the like (step S324).

Decryption processing unit 1520 of cellular phone 300 applies a decryption process on encrypted content data [Dc] Kc using the extracted content key Kc to generate content data Dc in plaintext. Audio decoding unit 1508 reproduces content data Dc and provides the same to combine unit 1510. Digital-analog converter 1512 converts the received data from combine unit 1510 into an analog signal to output the reproduced music (step S328). Thus, the process ends (step S330).

By the above-described structure, transmission from memory card 130 to cellular phone 300 can be effected to carry out a reproduction operation after encrypted content key [Kc] Kp is encrypted based on session key Ks1 generated at cellular phone 300. Since session key Ks1 is transferred between memory card 130 and cellular phone 300 after encryption with session key Ks2 generated for each session at memory card 130, security is further improved than in the second embodiment. The rights of both the copyright owner and the user can be protected.

According to such a structure, distribution data is stored in memory card that is detachable with respect to cellular phone 300. The memory card has to be loaded only at the time of receiving distribution or carrying out reproduction. Therefore, the convenience as a portable apparatus will not be degraded from the standpoint of weight and the like.

Furthermore, following distribution, reproduction can be carried out by loading the memory card to another reproduction apparatus. Therefore, the degree of freedom of the usage of audio data for the user is improved.

Fourth Embodiment

Figure 12:
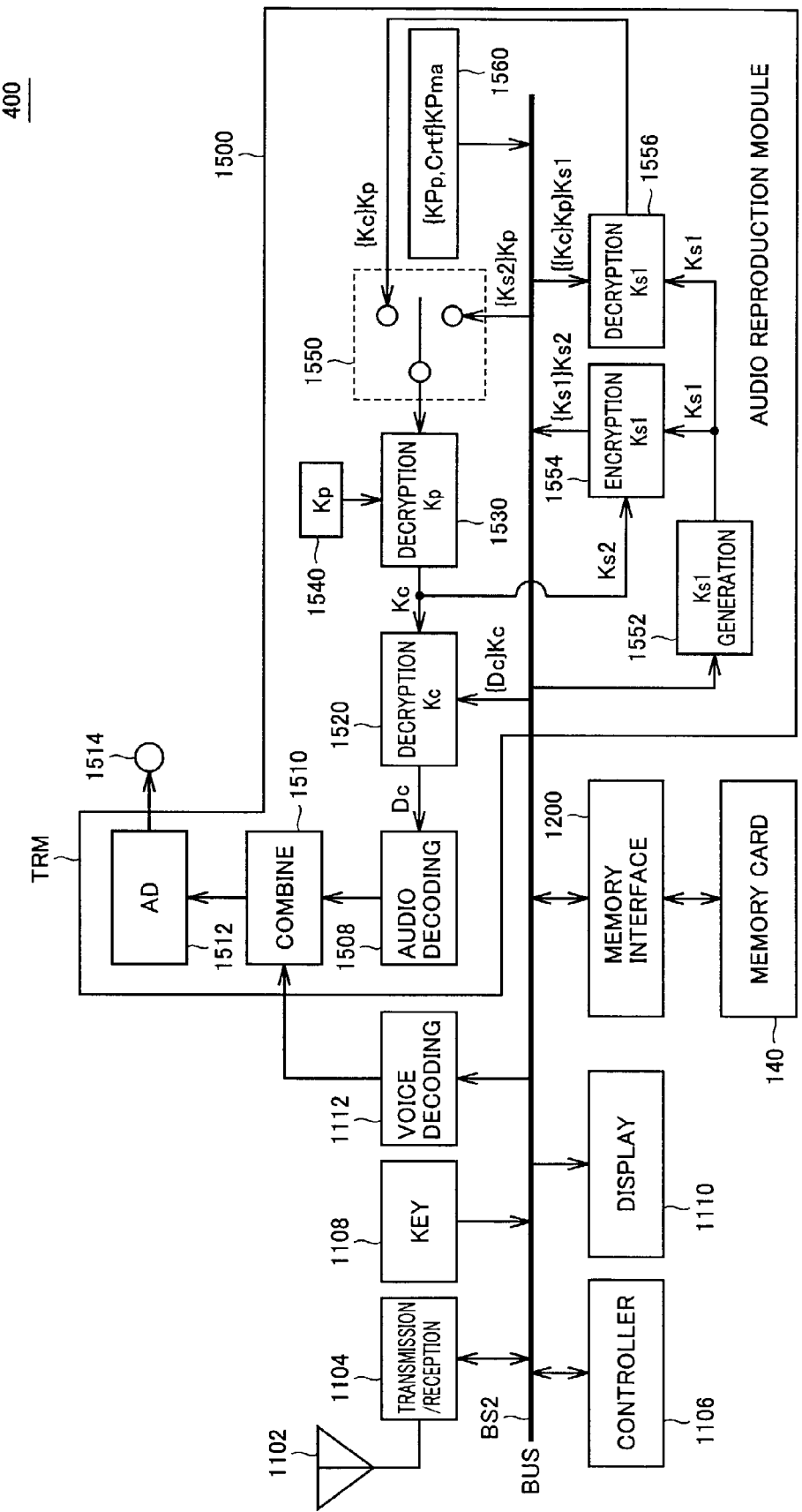
FIG. 12 is a schematic block diagram to describe a structure of a cellular phone 400 according to a fourth embodiment of the present invention.

FIG. 12 is a schematic block diagram to describe a structure of cellular phone 400 according to a fourth embodiment of the present invention. FIG. 12 is comparable with FIG. 8 corresponding to the third embodiment.

Cellular phone 400 of FIG. 4 shown in FIG. 12 differs in structure from cellular phone 300 of the third embodiment as set forth below.

Specifically, referring to FIG. 12, cellular phone 400 has a structure that can be loaded with a detachable memory card 140 to apply the required data to audio reproduction module 1500 in cellular phone 400 after a predetermined encryption process is applied on the stored content data and encrypted content key received by cellular phone 400. Memory card 140 differs from memory card 130 of the third embodiment in that an authentication capability is provided with respect to cellular phone 400, as will be described afterwards.

Furthermore, cellular phone 400 differs from cellular phone 300 in the structure of audio reproduction module 1500.

Specifically, audio reproduction module 1500 of cellular phone 400 further includes a [KPp, Crtf] KPma hold unit 1560 to realize an authentication function with respect to cellular phone 400 in the data transfer between memory card 140 and other components in cellular phone 400. [KPp, Crtf] KPma hold unit 1560 encrypts using a public decryption key (public authentication key) KPma common to the system a public encryption key KPp unique to the class (type) of cellular phone 400 which is a reproduction apparatus and authentication data Crtf and stores the encrypted public encryption key and authentication data.

The remaining components of cellular phone 400 are similar to those of cellular phone 300 of the third embodiment. Corresponding components have the same reference characters allotted, and the description thereof will not be repeated.

For the sake of simplification, only the block related to distribution of audio data of the present invention is depicted in FIG. 12. The block related to the conversation function inherent to a cellular phone is partially not illustrated.

In the structure of FIG. 12, audio decoding unit 1508, Kp hold unit 1540, decryption processing unit 1530, decryption processing unit 1520, decryption processing unit 1556, encryption processing unit 1554, session key generation unit 1552, switch circuit 1550 and [KPp, Crtf] KPma hold unit 1560 can be incorporated into the TRM.

By such a structure, the authentication data, decryption key and data in plaintext cannot be modified or looked by an external source. It is therefore difficult to improperly obtain the encryption scheme and private decryption key of cellular phone 400 from an external source. Thus, the security is improved.

Also, audio reproduction module 1500 corresponding to the region enclosed by a solid line in FIG. 12 can be set as the TRM. By such a structure, the eventual digital data of data subject to copyright protection such as audio data can be protected.

Structure of Encryption/Decryption Key

FIG. 13 is a diagram to describe together the characteristics of key data for communication used in cellular phone 400 of FIG. 12.

According to the structure shown in FIG. 12, the key used to control data processing in memory card 140 includes a public decryption key KPma common to the system and having the capability of an authentication key, and a session key Ks2 generated by memory card 140 and that is a symmetric key unique to each session.

Furthermore, the encryption key to maintain security as to data transfer with a source external to the memory card includes a public encryption key KPp that is unique to the class of the reproduction apparatus which is a cellular phone here, and stored in [KPp, Crtf] KPma hold unit 1560 in cellular phone 400 in an encrypted form by key KPma, a private decryption key Kp asymmetric to key KPp, and used to decrypt data encrypted with key KPp, and a session key Ks1 which is a symmetric key generated by session key generator 1552 for each access.

Session key Ks1 has a value unique to each communication session, and is under control of audio reproduction module 1500.

Here, "the class of reproduction apparatus" is the category to identify each reproduction apparatus or respective reproduction apparatuses of a particular type (manufacturer, manufacture lot).

With regards to the copyrighted data recorded in memory card 140, it is assumed that the encrypted content data is decrypted (into plaintext) using a content key Kc that is a symmetric key directed to encrypt content data (audio data) itself.

When content key Kc is distributed from distribution server 10 to cellular phone 400, it is assumed that content key Kc is encrypted with at least public encryption key KPp, and stored in memory card 140 as encrypted content key [Kc] Kp.

Furthermore, it is assumed that content data Dc subjected to copyright protection is stored in memory card 140 as encrypted content data [Dc] Kc that can be decrypted using content key Kc.

Structure of Memory Card

Figure 14:
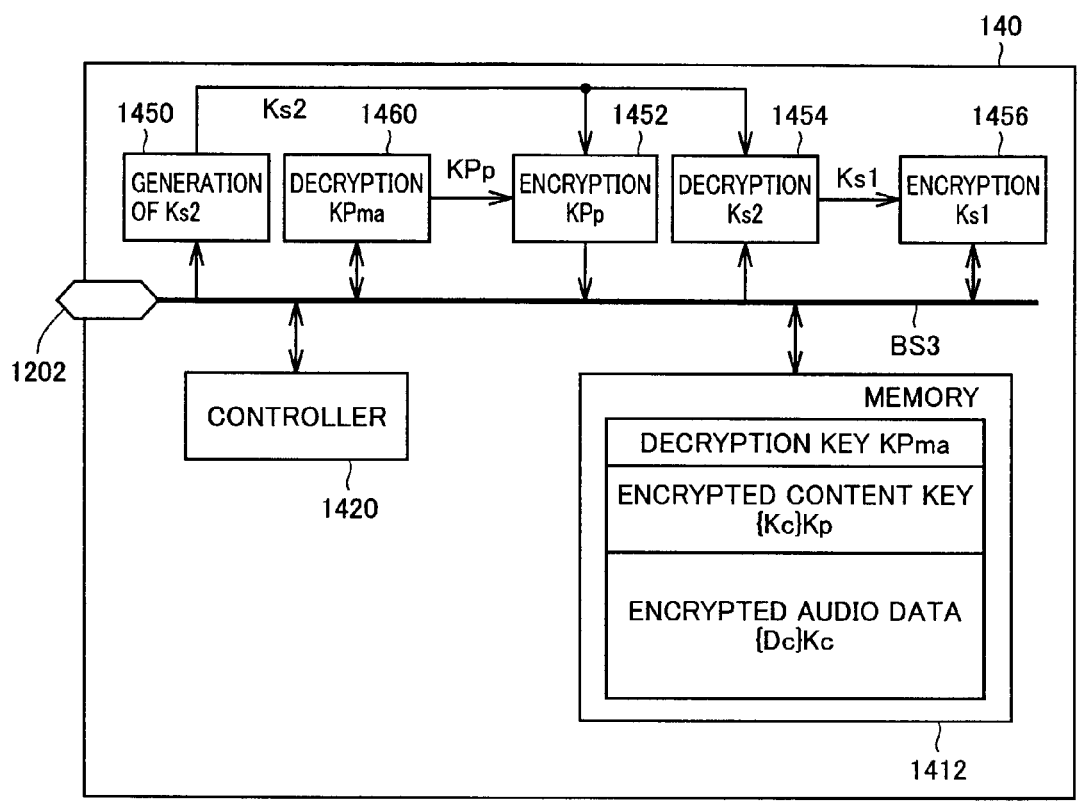
FIG. 14 is a schematic block diagram to describe a structure of memory card 140 shown in FIG. 12.

FIG. 14 is a schematic block diagram to describe a structure of memory card 140 shown in FIG. 12.

Memory card 140 differs in structure from memory card 130 of the third embodiment in that a decryption processing unit 1460 is included. Under control of controller 1420, decryption processing unit 1460 applies a decryption process on the data on data bus BS3 using public decryption key KPma to obtain public encryption key KPp and authentication data Crtf from cellular phone 140. Therefore, encryption processing unit 1452 carries out an encryption process based on public encryption key KPp from decryption processing unit 1460.

In memory 1412 of memory card 140 is stored a public decryption key KPma instead of public encryption key KPp stored for memory card 130. Therefore, decryption processing unit 1460 carries out a decryption process based on public decryption key KPma stored in memory 1412.

The remaining components of memory card 140 are similar to those of memory card 130 of the third embodiment. Corresponding components have the same reference characters allotted, and the description thereof will not be repeated.

Memory card 140 of FIG. 14 can be incorporated into module TRM to disable read out by a third party of data and the like in the circuitry residing in this region by erasing internal data or destroying internal circuitry at an attempt of an improper opening process or the like by an external source.

Reproduction Process

Figure 15:
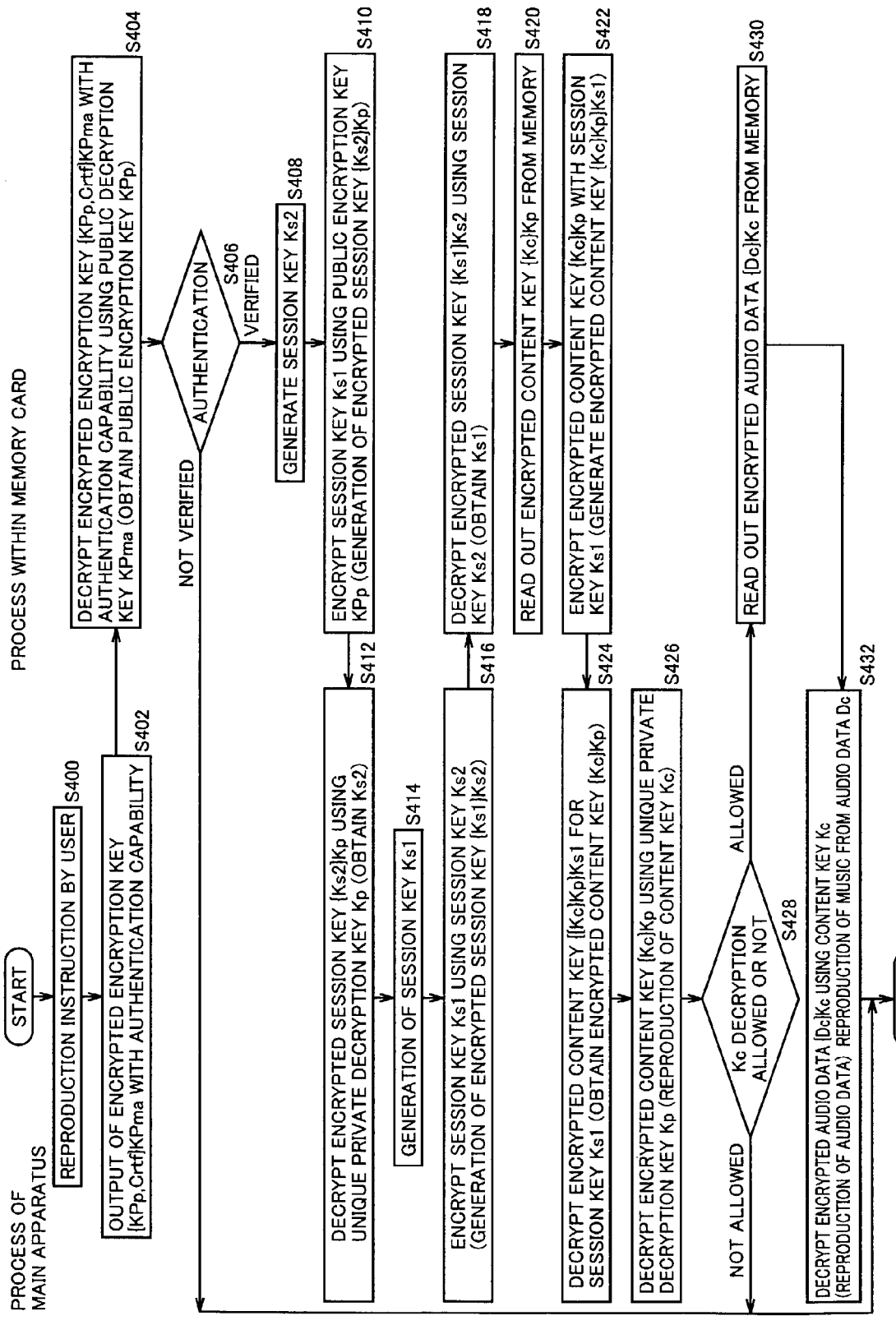
FIG. 15 is a flow chart to describe a reproduction process to provide music outside from encrypted content data stored in memory card 140.

FIG. 15 is a flow chart to describe a reproduction process of reproducing music from encrypted content data stored in memory card 140 for output as music in cellular phone 400.

Referring to the flow chart of the reproduction process of FIG. 15, application of a reproduction request (step S400) by a user's command through a keyboard 1108 or the like of cellular phone 400 causes data [KPp, Crtf] KPma to be output to memory card 140 from [KPp, Crtf] KPma hold unit 1560 of cellular phone 400 (step S402).

Decode unit 1460 in memory card 140 decrypts data [KPp, Crtf] KPma to obtain a public encryption key KPp and authentication data Crtf (step S406). Controller 1420 conducts authentication of cellular phone 400 based on authentication data Crtf (step S406). When cellular phone 400 is a proper apparatus, control proceeds to step S408. When cellular phone 400 is not a proper apparatus, the process ends without carrying out an operation for reproduction (step S434).

When cellular phone 400 is a proper apparatus, session key generation unit 1450 generates session key Ks2 under control of controller 1420 (step S408). Under control of controller 1420, encryption processing unit 1452 encrypts session key Ks2 using public encryption key KPp to generate encryption session key [Ks2] Kp. This encryption session key [Ks2] Kp is transmitted to cellular phone 400 via data bus BS3, terminal 1202 and memory interface 1200 (step S410).

When encrypted session key [Ks2] Kp is received from memory card 140, decryption processing unit 1530 of cellular phone 400 receives via switch circuit 1550 encrypted session key [Ks2] Kp and applies decryption to obtain session key Ks2 (step S412).

Session key generation unit 1552 of cellular phone 400 generates session key Ks1 (step S414). Encryption processing unit 1554 encrypts session key Ks1 using session key Ks2 extracted at step S412 to generate data [Ks1]Ks2. Data [Ks1]Ks2 is transmitted to memory card 140 via data bus BS2 (step S416).

Memory card 140 receives session key [Ks1] Ks2 generated and encrypted by cellular phone 400. Decryption processing unit 1454 decrypts the encrypted session key [Ks1] Ks2 using session key Ks2 to extract session key Ks1 (step 418).

Then, memory card 140 reads out encrypted data [Kc] Kp from memory 1412 (step S420). Encryption processing unit 1456 encrypts encrypted content key [Kc] Kp using extracted session key Ks1 to provide further encrypted content key [[Kc] Kp] Ks1 onto data bus BS2 via data bus BS3 and the like (step S422).

Decryption processing unit 1556 of cellular phone 400 applies a decryption process on further encrypted content key [[Kc] Kp] Ks1 transmitted from memory card 140 using session key Ks1 to obtain encrypted content key [Kc] Kp (step S424).

Decryption processing unit 1530 of cellular phone 400 receives encrypted content key [Kc] Kp via switch circuit 1550 to apply a decryption process of data [Kc] Kp based on key Kp from Kp hold unit 1540 (step S426).

When decryption processing unit 1530 can extract content key Kc by the decryption process (step S428), control proceeds to step S430, otherwise (step S428), the process ends (step S434).

When content key Kc is extracted by the decryption process of decryption processing unit 1530, memory card 140 reads out encrypted content data [Dc] Kc from memory 1412 and provides encrypted content data [Dc] Kc onto data bus BS2 via data bus BS3 and the like (step S430).

Decryption processing unit 1520 of cellular phone 400 decrypts encrypted content data [Dc] Kc using the extracted content key Kc to generate audio data Dc in plaintext. Audio decoding unit 1508 reproduces content data Dc and provides the reproduced data to combine unit 1510. Digital-analog converter 1512 converts the data received from combine unit 1510 to provide reproduced music outside (step S432). Thus, the process ends (step S434).

By the above-described structure, a reproduction operation is allowed only between memory card 140 and a cellular phone 400 verified as a proper apparatus as a result of authentication by memory card 140 based on data [[KPp, Crtf] KPma from cellular phone 400. Therefore, in addition to the advantages of cellular phone 300 and memory card 130 of the third embodiment, there are the advantages that the security of the system is further improved and the copyright of the copyright owner can be protected.

Fifth Embodiment

Figure 16:
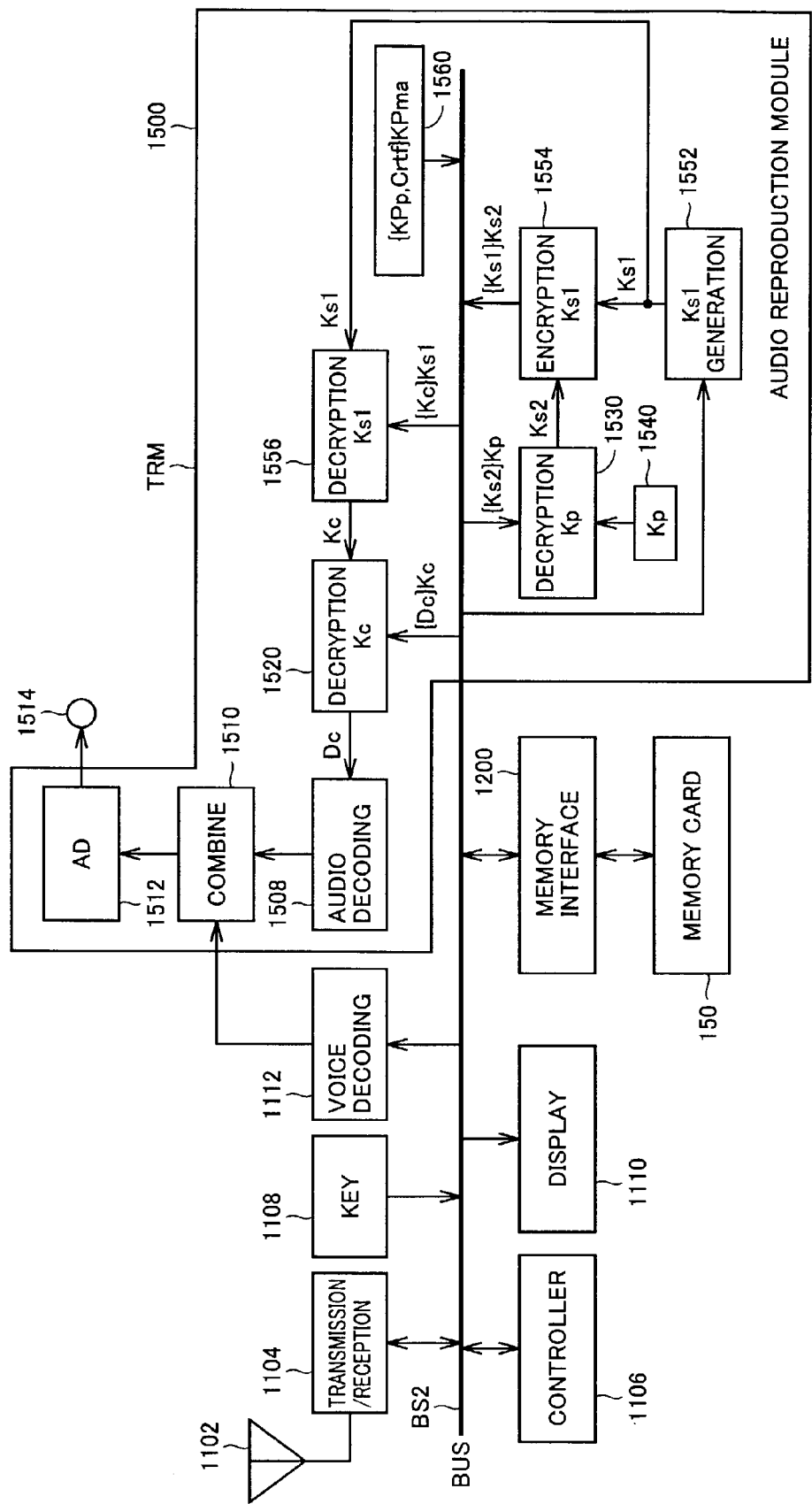
FIG. 16 is a schematic block diagram to describe a structure of a cellular phone 500 according to a fifth embodiment of the present invention.

FIG. 16 is a schematic block diagram to describe a structure of a cellular phone 500 according to a fifth embodiment of the present invention. FIG. 16 is comparable with FIG. 12 corresponding to the fourth embodiment.

Cellular phone 500 of the fifth embodiment shown in FIG. 16 differs in structure from cellular phone 400 of the fourth embodiment as set forth below.

Specifically, referring to FIG. 16, a memory card 150 is loaded instead of memory card 140. When content key Kc is transmitted from memory card 150 to cellular phone 500, the content key is encrypted by session key Ks 1 to be transmitted in an encrypted form of [Kc] Ks 1. The double encryption with keys KPp and Ks1 in the transmission of content key Kc implemented in the previous fourth embodiment is not carried out. Therefore, the decryption process with key Ks1 can be carried out independent of the decryption process with key Kp. Cellular phone 500 shown in FIG. 16 is absent of switch 1550.

Specifically, audio reproduction module 1500 of cellular phone 500 includes a Kp hold unit 1540 to store a private decryption key Kp, a decryption processing unit 1530 to decrypt data [Ks2] Kp applied from memory card 150 via data bus BS2 using key Kp, a session key generator 1552 to generate using a random number or the like a session key Ks1 that is used to encrypt data transferred on data bus BS2 for the data transfer between memory card 150 and other components of cellular phone 500, an encryption processing unit 1554 encrypting session key Ks1 generated by session key generator 1552 with session key Ks2 from memory card 150 to provide the encrypted key onto data bus BS2, a decryption processing unit 1556 decrypting for session key Ks1 an encrypted content key Kc with session key Ks1 transmitted from memory card 150 via data bus BS2, a decryption processing unit 1520 decrypting encrypted content data [Dc] Kc applied from memory card 150 via data bus BS2 based on content key Kc output from decryption processing unit 1556 and applying the decrypted content data to audio decoding unit 1508, and a [KPp, Crtf] KPma hold unit 1560 encrypting public encryption key KPp unique to the class (type) of cellular phone 500 which is a reproduction apparatus and authentication data Crtf using public decryption key KPma common to the system to realize an authentication function with respect to cellular phone 500 for data transfer between memory card 150 and other components of cellular phone 500.

The remaining components of cellular phone 500 are similar to those of cellular phone 400 of the fourth embodiment. Corresponding components have the same reference characters allotted, and description thereof will not be repeated.

For the sake of simplification, only the block related to distribution of content data of the present invention is depicted in FIG. 16. The block related to the conversation capability inherent to a cellular phone is partially not illustrated.

According to the structure of FIG. 16, audio decoding unit 1508, Kp hold unit 1540, decryption processing unit 1530, decryption processing unit 1520, decryption processing unit 1556, encryption processing unit 1554, session key generation unit 1552 and [KPp, Crtf] KPma hold unit 1560 can be incorporated into the TRM.

By the above structure, the authentication data, the decryption key and the data converted into plaintext cannot be modified or looked by a third party. It is therefore difficult for a third party to improperly obtain the encryption scheme and private decryption key of cellular phone 500. Thus, the security is improved.

Also, audio reproduction module 1500 corresponding to the region enclosed by a solid line in FIG. 16 can be set as the TRM. By such a structure, eventual digital data of content data subject to copyright protection subject to copyright protection such as audio data can be protected.

Structure of Memory Card

Figure 17:
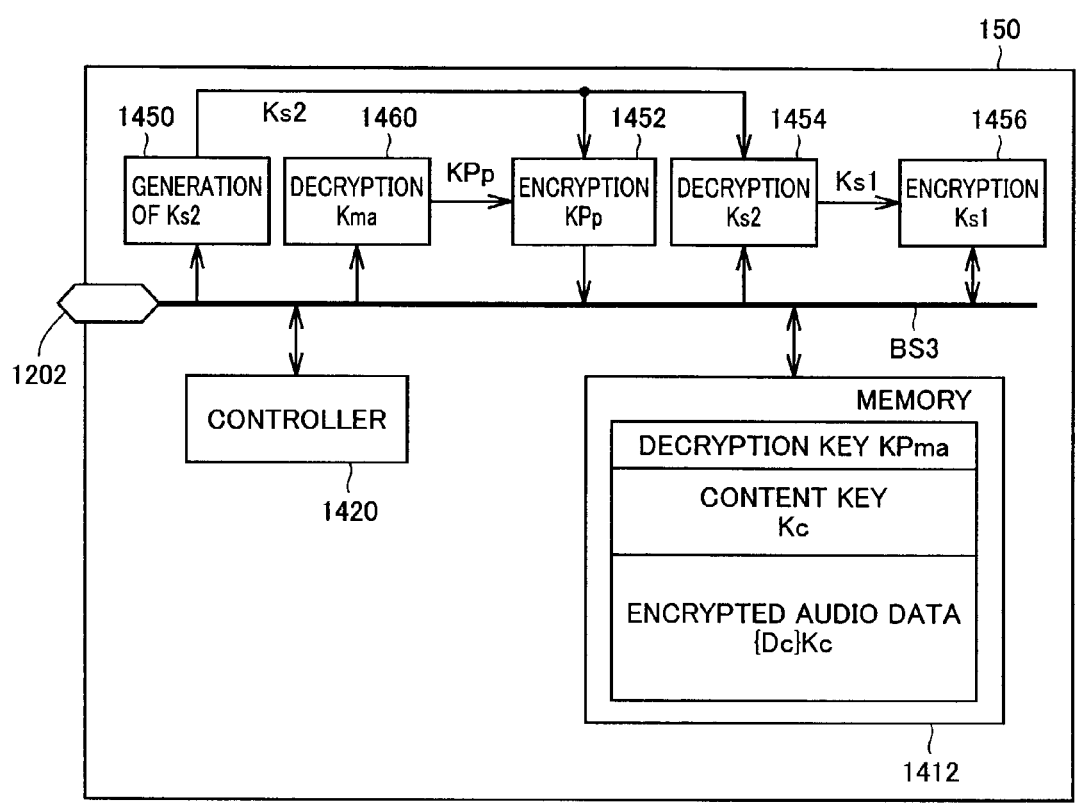
FIG. 17 is a schematic block diagram to describe a structure of memory card 150 shown in FIG. 16.

FIG. 17 is a schematic block diagram to describe a structure of memory card 150 shown in FIG. 16.

The structure of memory card 150 differs from the structure of memory card 140 of the fourth embodiment in that content key Kc is stored as plaintext data without being encrypted in memory 1412.

The remaining components of memory card 150 are similar to those of memory card 140 of the fourth embodiment. Corresponding components have the same reference characters allotted, and description thereof will not be repeated.

Memory card 150 of FIG. 17 can be incorporated into a module TRM to disable read out via a third party of data and the like in the circuitry residing in this region by erasing internal data or destroying internal circuitry at an attempt of an improper opening process or the like by an external source.

Reproduction Process

Figure 18:
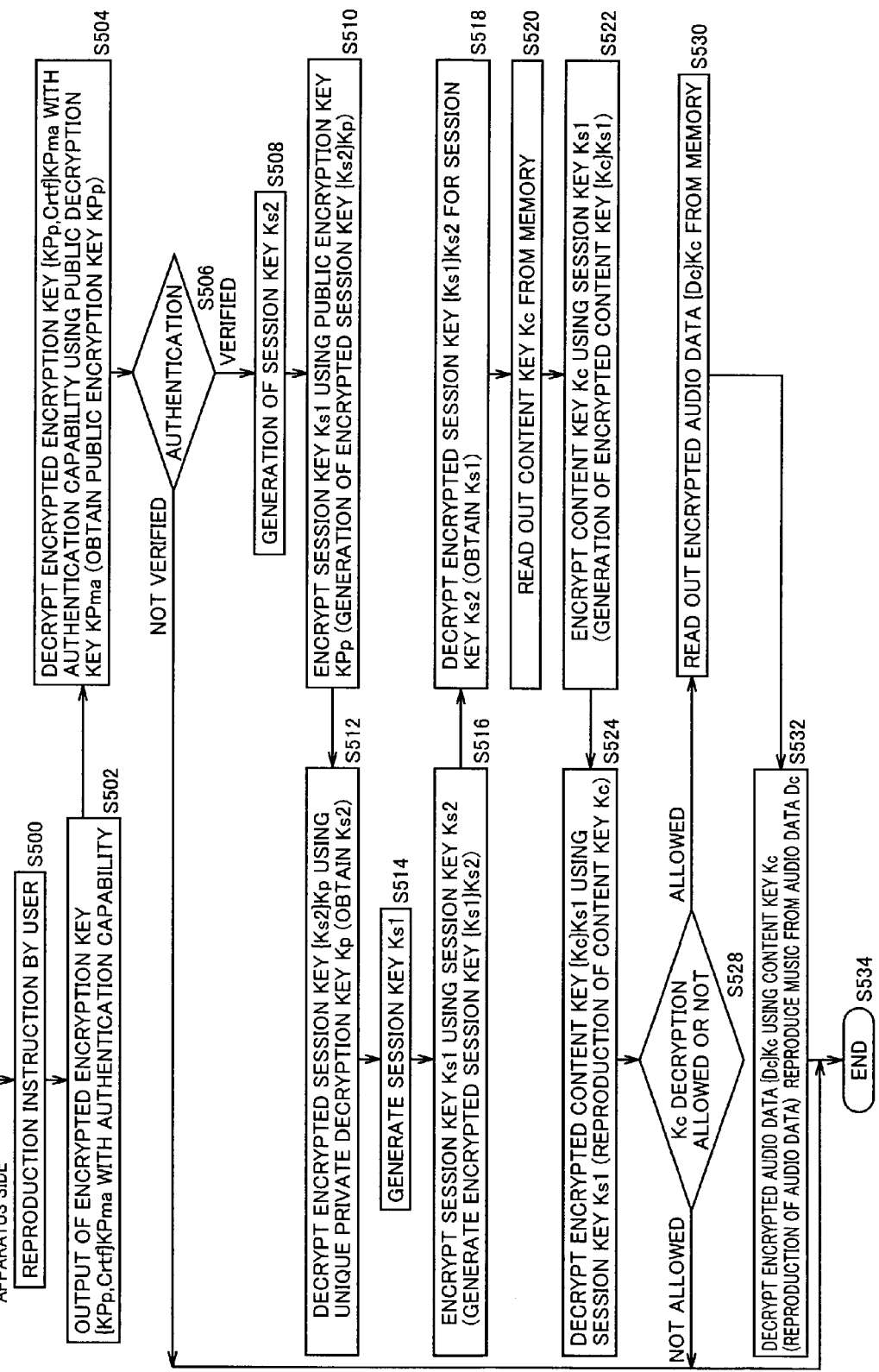
FIG. 18 is a flow chart to describe a reproduction process to provide music outside from encrypted content data stored in memory card 150.

FIG. 18 is a flow chart to describe a reproduction process of decrypting music information from encrypted content data stored in memory card 150 for music output in cellular phone 500.

Referring to the flow chart of the reproduction process of FIG. 18, application of a reproduction request (step S500) by a user's command through a keyboard 1108 or the like of cellular phone 500 causes data [KPp, Crtf] KPma to be output to memory card 150 from [KPp, Crtf] KPma hold unit 1560 of cellular phone 500 (step S502).

Decode unit 1460 of memory card 150 decrypts data [KPp, Crtf] KPma to obtain public encryption key KPp and authentication data Crtf (step S506). Controller 1420 conducts authentication of cellular phone 500 based on authentication data Crtf (step S506). When cellular phone 500 is a proper apparatus, control proceeds to step S508. When cellular phone 500 is not a proper apparatus, the operation for reproduction is not carried out, and the process ends (step S534).

When cellular phone 500 is a proper apparatus, controller 1420 causes session generator 1450 to generate a session key Ks2 (step S508). Under control of controller 1420, encryption processing unit 1452 encrypts session key Ks2 using public encryption key KPp to generate encrypted session key [Ks2] Kp. This encrypted session key [Ks2] Kp is transmitted to cellular phone 500 via data bus BS3, terminal 1202 and memory interface 1200 (step S510).

Upon reception of encrypted session key [Ks2] Kp from memory card 150 at cellular phone 500, decryption processing unit 1530 receives and decrypts encrypted session key [Ks2] Kp received via switch circuit 1550 to obtain a session key Ks2 (step S512).

At cellular phone 500, session key generation unit 1552 generates session key Ks1 (step S514). Encryption processing unit 1554 encrypts session key Ks1 using session key Ks2 extracted at step S512 to generate data [Ks1] Ks2. Data [Ks1] Ks2 is transmitted to memory card 150 via data bus BS2 (step S516).

Memory card 150 receives session key [Ks1] Ks2 generated and encrypted by cellular phone 500. Decryption processing unit 1454 decrypts encrypted session key [Ks1] Ks2 by session key Ks2 to extract session key Ks1 (step S518).

Then, memory card 150 reads out content key Kc from memory 1412 (step S520).

Encryption processing unit 1456 of memory card 150 encrypts content key Kc using extracted session key Ks 1 to apply encrypted content key [Kc] Ks1 onto data bus BS2 via data bus BS3 and the like (step S522).

Decryption processing unit 1556 of cellular phone 500 applies a decryption process on further encrypted content key [Kc] Ks1 transmitted from memory card 150 by session key Ks1 to obtain content key Kc (step S524).

Memory card 150 reads out encrypted content key [Dc] Kc from memory 1412 and applies encrypted content data [Dc] Kc onto data bus BS2 via data bus BS3 and the like (step S530).

Decryption processing unit 1520 of cellular phone 500 decrypts encrypted content data [Dc] Kc by extracted content key Kc to generate content data Dc in plaintext. Audio decoding unit 1508 reproduces content data Dc and provides the reproduced data to combine unit 1510. Digital-analog converter 1512 converts the data received from combine unit 1510 into an analog signal to output reproduced music (step S532). Thus, the process ends (step S534).

According to the above-described structure, a reproduction operation is allowed only between memory card 150 and a cellular phone 500 verified as a proper apparatus as a result of authentication of memory card 150, based on data [KPp, Crtf] KPma from cellular phone 500. Similar to the advantages of cellular phone 400 and memory card 130 of the previous fourth embodiment, protection on the copyright of the copyright owner can be conducted with a more simple structure.

Sixth Embodiment

Figure 19:
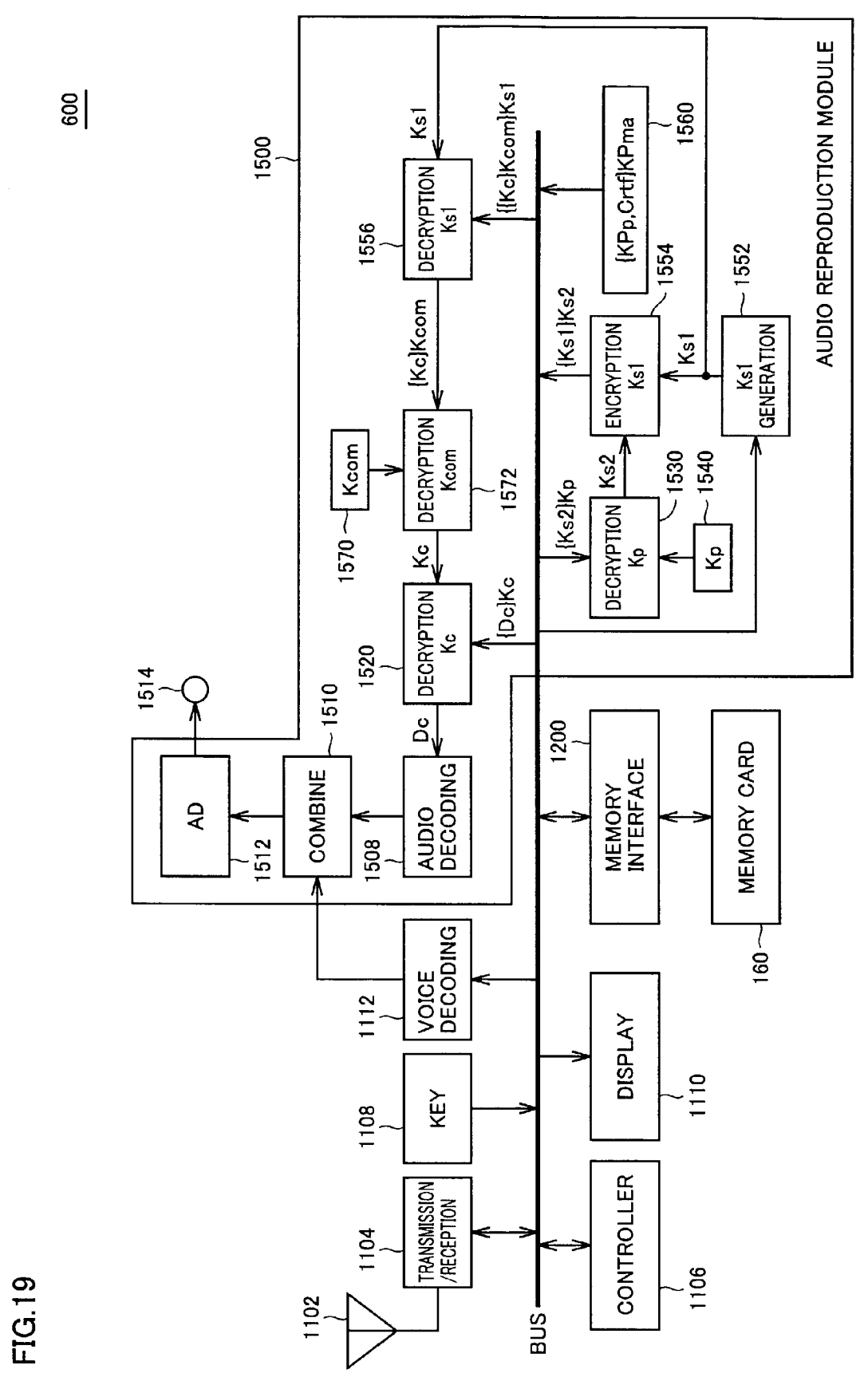

FIG. 19 is a schematic block diagram to describe a structure of a cellular phone 600 according to a sixth embodiment of the present invention. FIG. 19 is comparable with FIG. 16 corresponding to the fifth embodiment.

Cellular phone 600 of the sixth embodiment shown in FIG. 19 differs in structure from cellular phone 500 of the fifth embodiment as set forth below.

Referring to FIG. 19, cellular phone 600 includes a Kcom hold unit 1570 to store a private decryption key Kcom common to the system, and a decryption processing unit 1572 decrypting the output from decryption processing unit 1556 using private decryption key Kcom to obtain content key Kc, which is supplied to decryption processing unit 1520.

In contrast to the previous fifth embodiment where content key Kc is transmitted from memory card 150 to cellular phone 500 in the form of content key [Kc] Ks1 encrypted using session key Ks1, the sixth embodiment has the transmitted content key Kc from memory card 160 to cellular phone 600 in the form of encrypted content key [[Kc] Kcom] Ks1 that can be decrypted using private decryption key Kcom and session key Ks1.

The remaining components of cellular phone 600 are similar to those of cellular phone 500 of the fifth embodiment. Corresponding components have the same reference characters allotted, and description thereof will not be repeated.

For the sake of simplification, only the block related to distribution of audio data in the present invention is depicted in FIG. 19. The block related to the conversation function inherent to a cellular phone is partially not illustrated.

According to the structure shown in FIG. 19, audio decoding unit 1508, Kp hold unit 1540, decryption processing unit 1530, decryption processing unit 1520, decryption processing unit 1556, encryption processing unit 1554, session key generation unit 1552, [KPp, Crtf] KPma hold unit 1560, Kcom hold unit 1570 and decryption processing unit 1572 can be incorporated into a TRM.

By such a structure, a third party cannot obtain the authentication data, decryption key and content data in a plaintext form improperly. Therefore, the security is improved.

Also, audio reproduction module 1500 corresponding to the region enclosed by a solid line in FIG. 19 can be set as the TRM. By such a structure, eventual digital data of data subject to copyright protection such as audio data can be protected.

Structure of Encryption/Decryption Key

FIG. 20 is a diagram to describe together characteristics of key data for communication used in cellular phone 600 shown in FIG. 19.

According to the structure of FIG. 19, the key to control data processing in memory card 160 includes a public decryption key KPma common to the system, and a session key Ks2 unique to each section, and generated by memory card 160.

The encryption key to maintain security during data transfer with an external source to the memory card includes a public encryption key KPp unique to the class of the reproduction apparatus which is a cellular phone here, stored in [KPp, Crtf] KPma hold unit 1560 of cellular phone 600 in an encrypted form with key KPma as a key to control audio reproduction module 1500, a private decryption key Kp asymmetric to key KPp, and used to decrypt data encrypted with key KPp, a private decryption key Kcom common to the system, and a session key Ks1 which is a symmetric key generated by session key generator 1552 for each session.

Session key Ks1 has a value unique to each communication session, and is under control in audio reproduction module 1500.

With regards to copyright data recorded in memory card 160, it is assumed that encrypted content data is decrypted (converted into plaintext) using a symmetric key Kc that is a symmetric key directed to encrypt audio data (content data) per se.

When content key Kc is distributed from distribution server 10 towards cellular phone 600, it is assumed that content key Kc is at least encrypted so as to be decryptable by private decryption key Kcom, and stored in memory card 160 as encrypted content data [Kc] Kcom.

Also, it is assumed that content data Dc subject to copyright protection is stored in memory card 160 as encrypted content data [Dc] Kc that can be decrypted using content key Kc.

Structure of Memory Card

Figure 21:
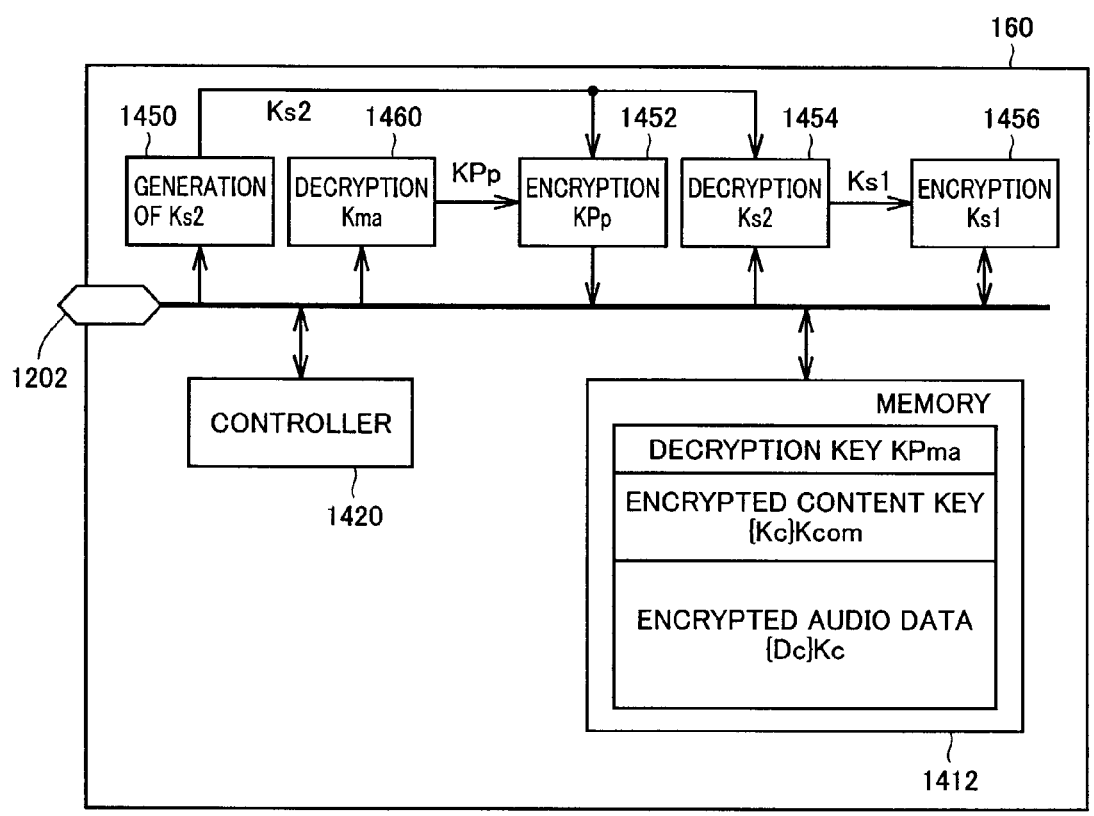
FIG. 21 is a schematic block diagram to describe a structure of memory card 160 shown in FIG. 19.

FIG. 21 is a schematic block diagram to describe a structure of memory card 160 shown in FIG. 19.

Memory card 160 differs in structure from memory card 150 of the fifth embodiment in that content data Kc is stored in memory 1412 as encrypted data [Kc] Kcom.

The remaining components of memory card 160 are similar to those of memory card 150 of the fifth embodiment. Corresponding components have the same reference characters allotted, and the description thereof will not be repeated.

Memory card 160 of FIG. 21 can be incorporated into a module TRM to disable read out by a third party of data and the like in the circuitry residing in this region by erasing internal data or destroying internal circuitry at an attempt of an improper opening process or the like by an external source.

Reproduction Process

Figure 22:
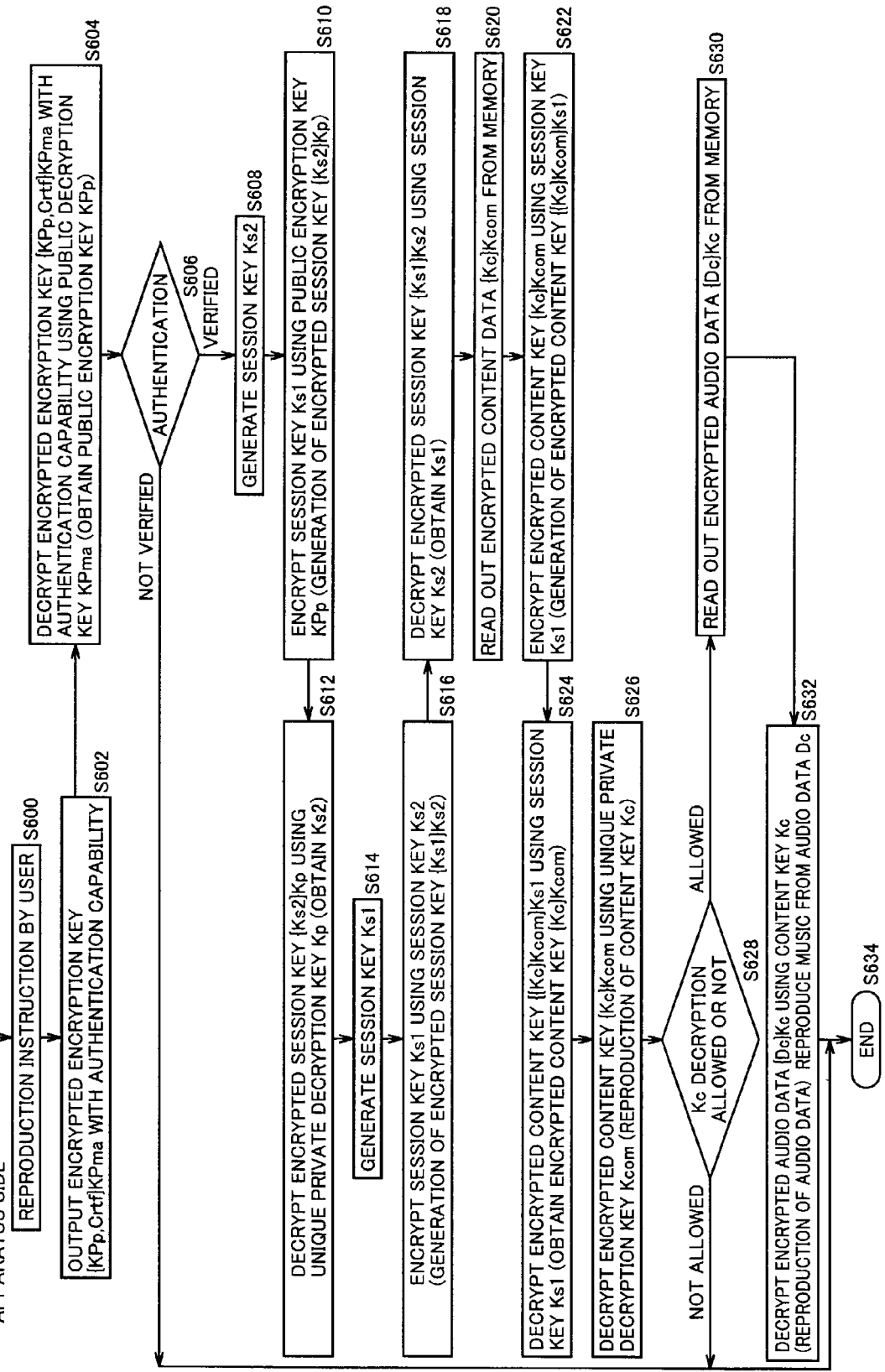
FIG. 22 is a flow chart to describe a reproduction process to provide music outside from encrypted content data stored in memory card 160.

FIG. 22 is a flow chart to describe a reproduction process of reproducing music from encrypted content data stored in memory card 160 for output.

Referring to FIG. 22, upon application of a reproduction request by a users command through keyboard 108 or the like of cellular phone 600 (step S600), data [KPp, Crtf] KPma is output to memory card 160 from [KPp, Crtf] KPma hold unit 1560 of cellular phone 600 (step S602).

Decode unit 1460 of memory card 160 decrypts data [KPp, Crtf] KPma to obtain public encryption key KPp and authentication data Crtf (step S606). Controller 1420 conducts authentication of cellular phone 600 based on authentication data Crtf (step S606). When cellular phone 600 is a proper apparatus, control proceeds to step S608. When cellular phone 600 is not a proper apparatus, the process ends without carrying out an operation for reproduction (step S634).

When cellular phone 600 is a proper apparatus, controller 1420 causes session key generator 1450 to generate a session key Ks2 (step S608). Under control of controller 1420, encryption processing unit 1452 encrypts public encryption key KPp using session key Ks2 to generate encrypted session key [Ks2] Kp. This encrypted session key [Ks2] Kp is transmitted to cellular phone 600 via data bus BS3, terminal 1202 and memory interface 1200 (step S610).

Upon reception of encrypted section key [Ks2] Kp from memory card 160 at cellular phone 600, decryption processing unit 1530 decrypts encrypted session key [Ks2] Kp received from decryption processing unit 1530 to obtain session key Ks2 (step S612).

Session key generation unit 1552 of cellular phone 600 generates session key Ks1 (step S614). Encryption processing unit 1554 encrypts session key Ks1 using session key Ks2 extracted at step S612 to generate encrypted session key [Ks1] Ks2. Encrypted session key [Ks1] Ks2 is transmitted to card 160 via data bus BS2 (step S616).

Memory card 160 receives encrypted session key [Ks1] Ks2 generated by cellular phone 600. Decryption processing unit 1454 decrypts the received encrypted session key [Ks1] Ks2 by session key Ks2 to extract session key Ks1 (step S618).

Then, memory card 160 reads out encrypted content key [Kc] Kcom from memory 1412 (step S620).

Then, encryption processing unit 1456 of memory card 160 encrypts encrypted content key [Kc] Kcom using extracted content key Ks1 to apply the further encrypted content key [[Kc] Kcom] Ks1 onto data bus BS2 via data bus BS3 and the like (step S622).

Decryption processing unit 1556 of cellular phone 600 decrypts further encrypted content key [[Kc] Kcom] Ks1 transmitted from memory card 160 by session key Ks1 to obtain encrypted content key [Kc] Kcom (step S624).

Decryption processing unit 1572 of cellular phone 600 receives encrypted content key [Kc] Kcom from decryption processing unit 1556 to apply a decryption process on encrypted content key [Kc] Kcom based on key Kcom from Kcom hold unit 1570 (step S626).

When content key Kc can be extracted by a decryption process by decryption processing unit 1572 (step S628), control proceeds to step S630, otherwise (step S628), the process ends (step S634).

When a content key Kc is extracted by the decryption process of decryption processing unit 1572, memory card 160 reads out encrypted content data [Dc] Kc from memory 1412 and applies the same to data bus BS2 via data bus BS3 and the like (step S630).

Decryption processing unit 1520 of cellular phone 600 decrypts encrypted content data [Dc] Kc using extracted content key Kc to generate content data Dc in plaintext. Audio decoding unit 1508 reproduces content data Dc and applies the reproduced content data to combine unit 1510. Digital-analog converter 1512 converts the data received from combine unit 1510 to output the reproduced music (step S632). Thus, the process ends (step S634).

According to the above-described structure, a reproduction operation is allowed only between memory card 160 and a cellular phone 600 verified as a proper apparatus as a result of authentication by memory card 160, based on data [KPp, Crtf] KPma from cellular phone 600. Therefore, similar to the advantages provided by cellular phone 400 and memory card 140 of the fourth embodiment, the security of the system can be improved and the copyright of the copyright owner can be prevented.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A data reproduction apparatus decrypting encrypted content data to reproduce content data, comprising:
   a data reproduction unit to reproduce said encrypted content data, and
   a data storage unit storing said encrypted content data and an encrypted content key, and providing said encrypted content data and said encrypted content key to said data reproduction unit, wherein said encrypted content key is a content key directed to decrypt said encrypted content data in an encrypted form decryptable with a first decryption key unique to said data reproduction unit;
   wherein said data reproduction unit comprises
   a session key generation unit generating a session key updated at every access to obtain said content key with respect to said data storage unit,
   a first encryption processing unit encrypting said session key using a public encryption key that can be decrypted at said data storage unit and that is unique to said data storage unit, and providing said encrypted session key to said data storage unit,
   a first decryption processing unit using said session key to decrypt said encrypted content key that is an encrypted version of said content key using said session key, said encrypted content key formally obtained from said data storage unit,
   a first key hold unit prestoring said first decryption key,
   a second decryption processing unit extracting said content key by applying a decryption process on an output from said first decryption processing unit using said first decryption key stored in said first key hold unit, and
   a third decryption processing unit receiving said encrypted content data read out from said data storage unit to decrypt said encrypted content data using a content key extracted by said second decryption processing unit to extract content data.

2. The data reproduction apparatus according to claim 1, said content data being coded audio data coded according to a coding scheme to reduce an amount of data,
   wherein said data reproduction unit comprises
   an audio decoding unit reproducing audio data based on said coding scheme from said coded audio data, and a digital-analog converter converting said reproduced audio data into an analog signal.

3. The data reproduction apparatus according to claim 1, wherein said data reproduction unit is provided in a security region that cannot be read out by a third party.

4. The data reproduction apparatus according to claim 1, wherein said data storage unit comprises
a record unit to store data applied to said data storage unit,
a second key hold unit storing said public encryption key unique to said data storage unit, and that can supply said public encryption key to said data reproduction unit,
a third key hold unit storing a second decryption key used to decrypt data encrypted with said public encryption key,
a fourth decryption processing unit using said second decryption key to decrypt said first session key transmitted from said data reproduction unit in an encrypted form by said public encryption key, and
a second encryption processing unit encrypting encrypted content key stored in said recording unit using said first session key extracted at said fourth decryption processing unit for output.

5. The data reproduction apparatus according to claim 1, wherein said data storage unit is detachable with respect to said data reproduction unit.

6. A data reproduction apparatus decrypting encrypted content data to reproduce content data, comprising:
a data reproduction unit decrypting said encrypted content data using a content key directed to decrypt said encrypted content data to reproduce content data, and
a data storage unit storing said encrypted content data and said content key, and encrypting a first session key with a unique decryption key unique to said data reproduction unit for supply to said data reproduction unit, said first session key differing for every access to obtain said content key,
wherein said data reproduction unit comprises
a first key hold unit prestoring said unique decryption key,
a first decryption processing unit applying a decryption processing using said unique decryption key which is an output from said first key hold unit,
a first session key generation unit generating a second session key updated for every access to obtain said content key with respect to said data storage unit,
a first encryption processing unit encrypting and applying to said data storage unit said second session key using a first session key that is a decrypted version of an encrypted first session key using said unique decryption key supplied from said data storage unit, said encrypted first session key is an encrypted version of said first session key using said unique decryption key at said first decryption processing unit, and
a second decryption processing unit using said second session key to decrypt an encrypted content key, said encrypted content key that is an encrypted version of said content key supplied from said data storage unit using said unique decryption key and further using said second session key,
said first decryption processing unit extracting said content key by applying a further decryption process on the output from said second decryption processing unit using said unique decryption key,
wherein said data reproduction unit further comprises a third decryption processing unit receiving said encrypted content data supplied from said data storage unit to decrypt said receive encrypted content data using a content key extracted by said first decryption processing unit to extract content data.

7. The data reproduction apparatus according to claim 6, wherein said content data is coded audio data encoded by a coding scheme to reduce an amount of data,
wherein said data reproduction unit further comprises
an audio decoding unit reproducing audio data based on said coding method from said coded audio data, and
a digital-analog converter converting said reproduced audio data into an analog signal.

8. The data reproduction apparatus according to claim 7, wherein said data reproduction unit has at least said first key hold unit, said first decryption processing unit, said second decryption processing unit and said third decryption processing unit provided in a security region that cannot be read out by a third party.

9. The data reproduction apparatus according to claim 6, wherein said data storage unit comprises
a recording unit to store data applied to said data storage unit,
a second session key generation unit generating said first session key,
a second encryption processing unit applying an encryption process using a public encryption key unique to said data reproduction unit and directed to apply encryption that can be decrypted with said unique decryption key,
a fourth decryption processing unit using said first session key to decrypt said second session key transmitted from said data reproduction unit in an encrypted form with said first session key, and
a third encryption processing unit carrying out an encryption process by said first session key extracted at said fourth decryption processing unit for output,
said content key stored in said recording unit being encrypted at said second encryption processing unit and further encrypted at said third encryption processing unit to be supplied to said data reproduction unit.

10. The data reproduction apparatus according to claim 9, further comprising an authentication data hold unit storing and supplying to said data storage unit authentication data unique to said data reproduction unit together with said public encryption key in an encrypted form decryptable by an authentication key at said data storage unit,
wherein said data storage unit comprises
a fifth decryption processing unit decrypting and extracting said authentication data and said public encryption key applied from said data reproduction unit in an encrypted form by said authentication key, and
control means carrying out an authentication process to determine whether to output said content key to a data reproduction unit from which said authentication data is output based on said authentication data extracted by said fifth decryption processing unit.

11. The data reproduction apparatus according to claim 6, wherein said data storage unit is a memory card detachable with respect to said data reproduction unit.

12. A data reproduction apparatus decrypting encrypted content data to reproduce content data, comprising:
a data reproduction unit decrypting said encrypted content data using a content key directed to decrypt said encrypted content data to reproduce content data, and
a data storage unit storing said encrypted content data and said content key, and encrypting and supplying to said data reproduction unit a first session key with a unique decryption key unique to said data reproduction unit, said first session key differing for every access to obtain said encrypted content data, wherein said data reproduction unit comprises a key hold unit prestoring said unique decryption key, a first decryption processing unit decrypting using said unique decryption key supplied from said data storage unit and said encrypted first session key and extracting said first session key, a session key generation unit generating a second session key updated for every access to obtain said content key with respect to said data storage unit, a first encryption processing unit encrypting and providing to said data storage unit said second session key by said first session key, a second decryption processing unit using said second session key to decrypt an encrypted content key, said encrypted content key is an encrypted version of said content key using said second session key, said encrypted content key supplied from said data storage unit, and a third decryption processing unit receiving said encrypted content data supplied from said data storage unit based on an output of said second decryption processing unit to extract content data.

13. The data reproduction apparatus according to claim 12, further comprising an authentication data hold unit storing, in an encrypted form decryptable by an authentication key, a public encryption key that is an encryption key unique to said data reproduction unit and directed to apply encryption that is decryptable with said unique decryption key and authentication data unique to said data reproduction unit, and that can output the stored public encryption key and authentication data to said data storage unit.

14. The data reproduction apparatus according to claim 13, wherein said data storage unit is detachable with respect to said data reproduction apparatus.

15. The data reproduction apparatus according to claim 13, wherein said data storage unit comprises a recording unit to store data applied to said data storage unit, a fourth decryption processing unit decrypting using an authentication key said public encryption key and said authentication data that are in an encrypted form decryptable by said authentication key to extract said public encryption key and said authentication data, a control unit providing control of an authentication process determining whether said content key is to be output or not to a data reproduction unit from which said authentication data is output based on said authentication data extracted at said fourth decryption processing unit, a second session key generation unit generating said first session key, a second encryption processing unit encrypting said first session key generated at said second session key generation unit by said public encryption key extracted at said fourth decryption, using said first session key, processing unit, a fourth decryption processing unit to decrypt said second session key transmitted from said data reproduction unit in an encrypted form with said first session key, and a third encryption processing unit carrying out an encryption process with said second session key extracted at said fourth decryption processing unit for output, wherein said content key stored in said recording unit is encrypted at said third encryption processing unit to be supplied to said data reproduction unit.

16. The data reproduction apparatus according to claim 12 wherein said content key is stored in said recording unit in an encrypted form decryptable with a predetermined second decryption key by said data reproduction apparatus, wherein said data reproduction unit further comprises a fifth decryption processing unit to carry out decryption using a predetermined second decryption key, wherein said fifth decryption processing unit receives as a decrypted result for said second session key by said second decryption processing unit said content key supplied from said data storage unit in an encrypted form decryptable with said second decryption key and further encrypted with said second session key, and decrypting said content key for said second decryption key to provide the decrypted content key to said third decryption processing unit.

17. The data reproduction apparatus according to claim 12, wherein said data storage unit is detachable with respect to said data reproduction apparatus.

18. The data reproduction apparatus according to claim 12, further comprising an interface for connection to a portable telephone network.

19. The data reproduction apparatus according to claim 18, further comprising a conversation processing unit to carry out conversation via said interface.

20. The data reproduction apparatus according to claim 12, wherein said data storage unit is a memory card detachable with respect to said data reproduction unit.

21. The data reproduction apparatus according to claim 12, wherein said data reproduction unit has at least said key hold unit, said first encryption processing unit, said first decryption processing unit, said second decryption processing unit and said third decryption processing unit provided in a security region that cannot be read out by a third party.

22. The data reproduction apparatus according to claim 12, wherein said data storage unit comprises a recording unit to store data applied to said data storage unit, a second session key generation unit generating said first session key, a second encryption processing unit encrypting said first session key generated at said second session key generation unit by a public encryption key unique to said content data reproduction unit and directed to apply encryption that can be decrypted with said unique decryption key, a fourth decryption processing unit to decrypt, using said first session key, said second session key transmitted from said data reproduction unit in an encrypted form with said first session key, and a third encryption processing unit applying an encryption process by said second session key extracted at said fourth decryption processing unit for output, wherein said content key stored in said recording unit is encrypted at said third encryption processing unit and supplied to said data reproduction unit.

23. A data reproduction module to be loaded in a data reproduction apparatus decrypting encrypted content data to reproduce content data, comprising:

a first key hold unit prestoring a first decryption key unique to said data reproduction module, a first decryption processing unit using said first decryption key to decrypt an encrypted first session key supplied from a source external to said data reproduction module, said encrypted first session key is an encrypted version of a first session key using said first decryption key, said first session key differing for every access to obtain a content key which is a decryption key directed to decrypt said encrypted content data, and extracting said decrypted first session key, a session key generation unit generating a second session key updated for every access to obtain said content key with respect to a source external to said data reproduction module, an encryption processing unit encrypting said second session key using said first session key for output to an external source to said data reproduction module, a second decryption processing unit using said second session key to decrypt said content key encrypted with said second session key and supplied from an external source to said data reproduction module, and a third decryption processing unit receiving and decrypting said encrypted content data supplied from an external source to said data reproduction module, based on an output of said second decryption processing unit to extract content data.

24. The data reproduction module according to claim 23, further comprising an authentication data hold unit storing a public encryption key unique to said data reproduction module and which is an encryption key that can be decrypted with said first decryption key and authentication data unique to said data reproduction module in an encrypted form that can be decrypted by an authentication key at an external source to said data reproduction module, and that can output the stored public encryption key and authentication data to an external source to said data reproduction module.

25. The data reproduction module according to claim 23, wherein said content key is input from an external source to said data reproduction module in an encrypted form with said second session key, and said second decryption processing unit provides a decrypted result to said third decryption processing unit as a content key directed to decrypt said encrypted content data.

26. The data reproduction module according to claim 23, wherein said content key is input from an external source to said data reproduction module in an encrypted form decryptable with said first decryption key, and further encrypted with said second session key, wherein said first decryption processing unit decrypts using said first decryption key a content key in an encrypted form decryptable with said first decryption key which is an output of said second decryption processing unit to extract and provide to said third decryption processing unit said content key.

27. The data reproduction module according to claim 23, wherein said content key is input from an external source to said data reproduction module in an encrypted form that can be decrypted with said second decryption key, and encrypted with said second session key, wherein said data reproduction module further comprises a second key hold unit prestoring said second decryption key, and a fourth decryption processing unit using said second decryption key to decrypt said content key subjected to encryption that can be decrypted with said second decryption key output from said second decryption processing unit to extract and provide to said third decryption processing unit said content key.

28. The data reproduction module according to claim 23, wherein said content data is coded data coded with a coding scheme to reduce an amount of data, said data reproduction module further comprising a decoding unit reproducing data based on said coding scheme from said coded data.

29. The data reproduction module according to claim 23, wherein said content data is coded audio data coded with a coding scheme to reduce an amount of data, said data reproduction module further comprising:

an audio decoding unit reproducing audio data based on said coding scheme from said coded audio data, and a digital-analog converter converting said reproduced audio data into analog signals.

30. The data reproduction module according to claim 23, wherein said data reproduction module is a tamper resistance module.

31. A data reproduction apparatus to be loaded with a data recording apparatus storing encrypted content data and a content key which is a decryption key directed to decrypt said encrypted content data to obtain content data, and encrypting a first session key differing for every access to obtain said encrypted content data into a form decryptable with a unique decryption key unique to said data reproduction apparatus, said data reproduction apparatus reproducing said encrypted content data stored in said data recording apparatus using a content key stored in said data recording apparatus, comprising:

a first interface to attach said data recording apparatus and carry out data transfer with said data recording apparatus, a key hold unit prestoring a unique key unique to said data reproduction apparatus, a first decryption processing unit using said unique decryption key to decrypt an encrypted first session key reproduction apparatus, said encrypted first session key is an encrypted version of a first session key using a unique decryption key unique to said data reproduction apparatus, said first session key differing for every access to obtain said content key and extracting said first session key, a session key generation unit generating a second session key updated for every access to obtain said encrypted content key with respect to said data recording apparatus, an encryption processing unit encrypting said second session key using said first session key to supply said encrypted session key to said data recording apparatus, a second decryption processing unit using said second session key to decrypt said content key encrypted with said second session key and supplied from said data recording apparatus, a third decryption processing unit receiving and decrypting said encrypted content data read out from said data recording apparatus based on an output of said second decryption processing unit to extract content data.

32. The data reproduction apparatus according to claim 31, further comprising an authentication data hold unit storing a public encryption key which is an encryption key unique to said data reproduction apparatus and decryptable with said unique decryption key and authentication data unique to said data reproduction apparatus in an encrypted form that can be decrypted by an authentication key at said data recording apparatus, and providing the stored public encryption key and authentication data to said data recording apparatus.

33. The data reproduction apparatus according to claim 31, wherein said content key is encrypted with said second session key and supplied from said data recording apparatus, and said second decryption processing unit provides a decrypted result to said third decryption processing unit as a content key directed to decrypt said encrypted content data.

34. The data reproduction apparatus according to claim 31, wherein said content key is encrypted in a form decryptable with said unique decryption key, and encrypted with said second session key to be supplied from said data recording apparatus,
wherein said first decryption processing unit uses said unique decryption key to decrypt an encrypted content key that can be decrypted with said unique decryption key which is an output of said second decryption processing unit to extract and provide to said third decryption processing unit said content key.

35. The data reproduction apparatus according to claim 31, wherein said content key is encrypted in a form decryptable with said second decryption key, and encrypted with said second session key to be supplied from said data recording apparatus,
said data reproduction apparatus further comprising:
a second key hold unit prestoring said second decryption key, and
a fourth decryption processing unit using said second decryption key to decrypt said content key in an encrypted form decryptable with said second decryption key output from said second decryption processing unit to extract and provide to said third decryption processing unit said content key.

36. The data reproduction apparatus according to claim 31, wherein said content data is coded data encoded by a coding scheme to reduce an amount of data,
said data reproduction apparatus further comprising a decoding unit reproducing data based on said coding scheme from said coded data.

37. The data reproduction apparatus according to claim 31, wherein said content data is coded audio data coded by a coding scheme to reduce an amount of data,
said data reproduction apparatus comprising:
an audio decoding unit reproducing audio data based on said coding scheme from said coded audio data, and
a digital-analog converter converting said reproduced audio data into analog signals.

38. The data reproduction apparatus according to claim 31, further comprising a second interface connected to a portable telephone network.

39. The data reproduction apparatus according to claim 38, further comprising a conversation processing unit to carry out conversation via said second interface.

40. The data reproduction apparatus according to claim 31, said data reproduction apparatus comprising a security region that cannot be read out by a third party,
wherein at least said first key hold unit, said session key generation unit, said encryption processing unit, said first decryption processing unit, said second decryption processing unit and said third decryption processing unit are provided in said security region.

41. The data reproduction apparatus according to claim 35, said data reproduction apparatus including a security region that cannot be read out by a third party,
wherein at least said first key hold unit, said second key hold unit, said session key generation unit, said encryption processing unit, said first decryption processing unit, said second decryption processing unit, said third decryption processing unit, and said fourth decryption processing unit are provided in said security region.

* * * * *